(12) United States Patent
Inoue

(10) Patent No.: US 8,115,952 B2
(45) Date of Patent: Feb. 14, 2012

(54) DOCUMENT MANAGING SYSTEM, IMAGE FORMING DEVICE, DISCARDING DEVICE, DISCARD CERTIFICATE ISSUING DEVICE, DOCUMENT ATTRIBUTE MANAGING DEVICE, AND COMPUTER READABLE MEDIUM

(75) Inventor: Nobuo Inoue, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1249 days.

(21) Appl. No.: 11/826,291

(22) Filed: Jul. 13, 2007

(65) Prior Publication Data
US 2008/0115044 A1 May 15, 2008

(30) Foreign Application Priority Data
Nov. 9, 2006 (JP) .................... 2006-303566

(51) Int. Cl.
G06F 3/12 (2006.01)
G06F 7/00 (2006.01)
G06F 7/04 (2006.01)
G06K 15/00 (2006.01)
H04N 1/00 (2006.01)

(52) U.S. Cl. ...... 358/1.15; 358/1.12; 358/403; 705/308; 707/654; 707/687; 707/E17.008; 726/33

(58) Field of Classification Search ............... 358/1.12, 358/1.15, 403; 705/308; 726/33
See application file for complete search history.

(56) References Cited

U.S. PATENT DOCUMENTS
2006/0274352 A1* 12/2006 Nakaguma et al. .......... 358/1.14
2007/0057099 A1* 3/2007 Kubo et al. ................. 241/101.2

FOREIGN PATENT DOCUMENTS
| JP | A-06-098132 | 4/1994 |
| JP | A-2001-243103 | 9/2001 |
| JP | A-2004-310293 | 11/2004 |
| JP | A-2005-085315 | 3/2005 |
| JP | A 2005-190365 | 7/2005 |
| JP | A-2006-093921 | 4/2006 |
| JP | A-2006-198798 | 8/2006 |

OTHER PUBLICATIONS

Japanese Office Action issued in Application No. 2006-303566; dated Oct. 26, 2010 (with translation).

* cited by examiner

Primary Examiner — Thomas Lett
(74) Attorney, Agent, or Firm — Oliff & Berridge, PLC

(57) ABSTRACT

A document managing system includes: an image forming device that includes an image forming part, and forms a document on a prescribed output medium; a discarding device that includes a document discarding part that discards the document formed on the output medium by the image forming device; and a discard certificate issuing device that includes a discard certificate issuing part, and issues a certificate of a discarding process in the discarding device.

22 Claims, 19 Drawing Sheets

FIG. 8A

| CERTIFICATE ISSUING DEVICE SPECIFYING INFORMATION | ADDRESS ON INFORMATION COMMUNICATION PATH |
|---|---|
| MC NO. | IP ADDRESS |
| 6543210 | 129. 249. 123. 456 |
| 6012345 | 129. 249. ***. +++ |
| ... | ... |

FIG. 8B

| DOCUMENT ATTRIBUTE MANAGING DEVICE SPECIFYING INFORMATION | ADDRESS ON INFORMATION COMMUNICATION PATH |
|---|---|
| MC NO. | IP ADDRESS |
| 7543210 | 129. 249. ###. +++ |
| 7012345 | 129. 249. $$$. +++ |
| ... | ... |

FIG. 8C

| OUTPUT DEVICE SPECIFYING INFORMATION (CERTIFICATE ISSUING DEVICE SPECIFYING INFORMATION) (DOCUMENT ATTRIBUTE MANAGING DEVICE SPECIFYING INFORMATION) | ADDRESS ON INFORMATION COMMUNICATION PATH |
|---|---|
| MC NO. | IP ADDRESS |
| 2543210 | 129. 249. ***. ### |
| 2012345 | 129. 249. ***. $$$ |
| ... | ... |

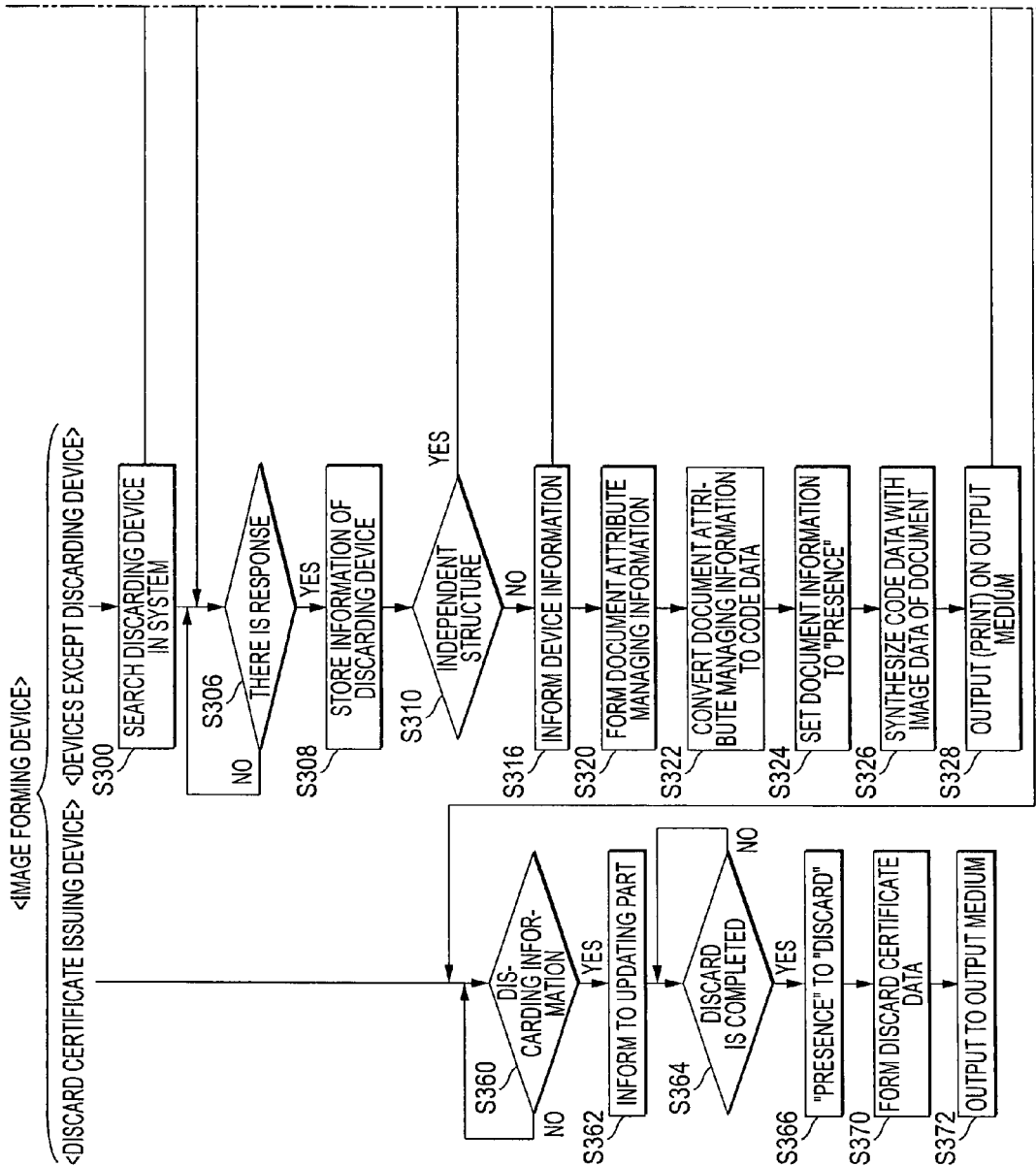
(FIG.11 CONTINUED)

DOCUMENT MANAGING SYSTEM, IMAGE FORMING DEVICE, DISCARDING DEVICE, DISCARD CERTIFICATE ISSUING DEVICE, DOCUMENT ATTRIBUTE MANAGING DEVICE, AND COMPUTER READABLE MEDIUM

CROSS-REFERENCE TO RELATED APPLICATIONS

This application is based on and claims priority under 35 U.S.C. 119 from Japanese Patent Application No. 2006-303566 filed Nov. 9, 2006.

BACKGROUND

1. Technical Field

The present invention relates to a document managing system, an image forming device, a discarding device, a discard certificate issuing device, a document attribute managing device, and a computer readable medium.

2. Related Art

Recently, various techniques have been proposed to manage an output to a discard of a document, especially, to handle printed document as confidential document.

SUMMARY

According to an aspect of the present invention, A document managing system includes: an image forming device that includes an image forming part, and forms a document on a prescribed output medium; a discarding device that includes a document discarding part that discards the document formed on the output medium by the image forming device; and a discard certificate issuing device that includes a discard certificate issuing part, and issues a certificate of a discarding process in the discarding device.

BRIEF DESCRIPTION OF THE DRAWINGS

Exemplary embodiment of the present invention will be described in detail based on the following figures, wherein:

FIGS. 8A to 8C are diagrams for explaining device specifying information respectively managed in a discarding device;

DETAILED DESCRIPTION

Figure 1:
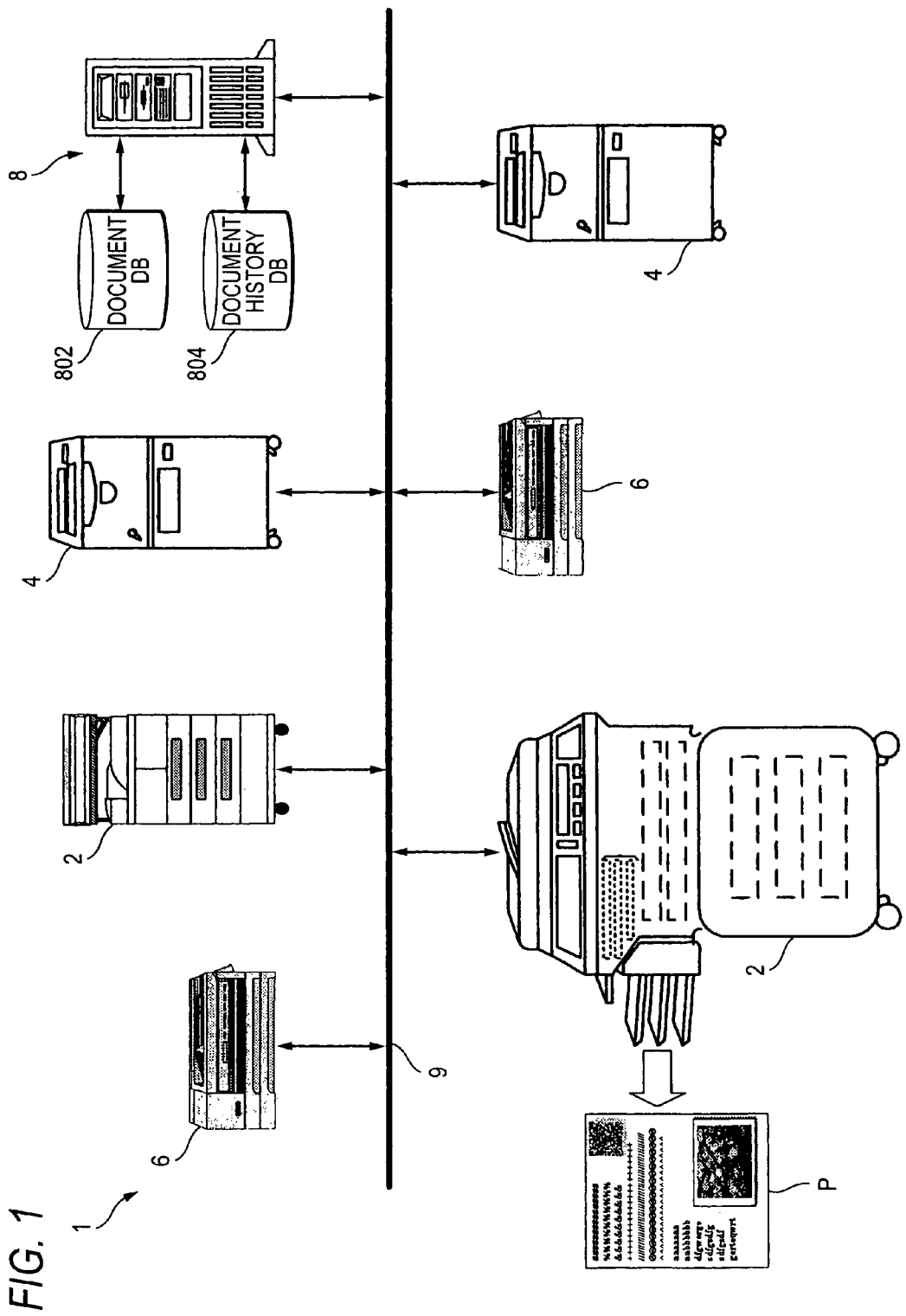
FIG. 1 is a diagram showing one embodiment of a document managing system.

Now, embodiments of the present invention will be described below in detail by referring to the drawings.

(Summary of Structure of System)

FIG. 1 is a diagram showing one embodiment of a document managing system for managing a document outputted to a prescribed output medium (for instance, a printing sheet) from an image forming device. As shown in the drawing, the document managing system 1 having a discarding process function of this embodiment includes an image forming device 2 having a printing function for outputting a document on the output medium such as the printing sheet, a discarding device 4 for discarding the document (namely, outputted from the image forming device 2) formed on the output medium P by the image forming device 2, a discard certificate issuing device 6 for issuing a certificate of a discarding process (refer it also to as a discard certificate, hereinafter) in the discarding device 4, a document attribute managing device 7 for managing document attribute managing information formed in the image forming device 2 and a document managing server 8 for managing the output document. The devices are respectively connected together by using an information communication path 9.

The information communication path 9 may be formed with a wired system or a wireless system. Further, the information communication path 9 may have a form that directly connects between the devices respectively or have a structure of a communication network such as a LAN (Local Area Network) or a WAN (Wide Area network). Here, the information communication path 9 has the structure of the communication network. When the communication network structure is used, a network card for taking a connecting interface or a function part equivalent thereto is provided in each of the devices.

The structure of the system shown in FIG. 1 has a typical form and two image forming devices 2, two discarding devices 4 or two discard certificate issuing devices 6 are respective shown. However, these devices may respectively include one or three sets or more. Further, the image forming device 2 may also serve as the discard certificate issuing device 6. Further, the image forming device 2, the discarding device 4 or the discard certificate issuing device 6 includes the function of the document managing server 8, so that the structure of the system having no document managing server 8 may be physically adopted. When the structure of the system having no document managing server 8 is used, the image forming device 2, the discarding device 4 and the discard certificate issuing device 6 may be directly connected together without using the network. Further, a print server may be provided as required.

As the image forming device 2, any of devices may be used that has a printing function of the document such as a printing device, a copying machine or a facsimile device for outputting the document on the output medium, for instance, the printing sheet or a compound machine having the functions of these devices in combination.

As the discarding device 4, may be used a cutter (what is called a shredder) for shredding the document whose intended use is finished or a discarding box that is restricted to be taken out by indefinite operators (describe the operator also as a user, hereinafter).

The document managing server 8 is provided with a document data base (a document DB) 802 in which the document (refer it also to as a confidential document, hereinafter) whose free inspection is limited from the viewpoint of security is previously registered. Further, the document managing server 8 is provided with an output history data base (an output history DB) 804 for registering the history of the confidential document outputted from the image forming device 2 if necessary. When the function of the document attribute managing device 7 is provided in the document managing server 8, the output history data base 804 is provided as a device in place of the document attribute managing device 7.

The document managing server 8 can include not only a function for storing the document, but also the function of the document attribute managing device 7 and manages the output process of the document by the image forming device 2, the discarding process of the document outputted from the image forming device 2 by the discarding device 4 and the issuing process of the discard certificate by the discard certificate issuing device 6.

That is, in this embodiment, the confidential document is started to be managed as soon as the confidential document is outputted to the output medium such as the printing sheet by the image forming device 2. The management of the output document means that the output of the confidential document is recorded in the output history data base 804, further, processes till the confidential document is discarded (rejected) by the discarding device 4 can be followed and the issuance of the discard certificate by the discard certificate issuing device 6 and processes subsequent thereto can be also followed.

An arrangement for managing the document in this embodiment is not limited to the confidential document in view of the structure of the system and may be applied to an ordinary document. However, in this embodiment, an explanation will be given to the confidential document as an object.

A summary of the flow of managing the confidential document in this embodiment is described below. Either a start by directly operating the image forming device 2 or a start of processes through the document managing server 8 may be selected. In either case, the confidential document is printed on the output medium P by using the image forming device 2.

At this time, in this embodiment, document attribute managing information including information (refer it to as document specifying information, hereinafter) for exclusively specifying the document to be outputted and information (refer it to as output device specifying information, hereinafter) for exclusively specifying the image forming device 2 that carries out the output process of the document is attached to the output medium P.

Further, when the discard certificate issuing device 6 that issues the discard certificate is provided independently of the image forming device 2 in the structure of the system, information (refer it to as certificate issuing device specifying information, hereinafter) for exclusively specifying the discard certificate issuing device 6 is preferably included in the document attribute managing information and attached to the output medium P.

Further, in the case of the structure that manages the document attribute managing information formed in the image forming device 2, when the document attribute managing device 7 having a function part for managing the document attribute managing information is provided independently of the image forming device 2 in the structure of the system, information (refer it to as document attribute managing device specifying information, hereinafter) for exclusively specifying the document managing device 7 is preferably included in the document attribute managing information and attached to the output medium P so as to update the managing state of document information in association with the discarding process in the discarding device 4.

The document specifying information for exclusively specifying the document to be outputted means information that can discriminate the document from other document and various kinds of information that satisfy this condition can be used. As the document specifying information, any one of, for instance, information (refer it to as process time information, hereinafter) for exclusively specifying the date of the output process, information such as a user ID (refer it to as user information, hereinafter) for exclusively specifying a user who instructs the output process or information (refer it to as service type information, hereinafter) for specifying types of services including a print (an ordinary print), a copy, Fax, etc. as the forms of the output processes or an arbitrary combination of them may be used. Preferably, all of the process time information (the date), the user information (the user ID) and the service type information may be included.

The output device specifying information for exclusively specifying the image forming device 2, the discard certificate issuing device 6 or the document attribute managing device 7 means information that can discriminate the above-described devices respectively from other devices in the system and various kinds of information that satisfy this condition can be used. As the output device specifying information, the certificate issuing device specifying information and the document attribute managing device specifying information, for instance, a device number (MC No.) using the model number or the serial number of a device or other arbitrary number or an MAC address (Media Access Control Address) peculiarly assigned to the network card may be used.

Further, especially when the information communication path 9 has the communication network structure, information (refer it also to as address information, hereinafter) for specifying respectively the addresses of the devices on the information communication path 9 may be included in the document attribute managing information and attached to the output medium P. As the address information, for instance, IP (Internet Protocol) addresses of the devices may be respectively used.

Further, the output device specifying information and the corresponding address information of the image forming device 2 may be also collectively referred to as output device information. The certificate issuing device specifying information and the corresponding address information of the discard certificate issuing device 6 may be also collectively referred to as discard certificate issuing device information. The document attribute managing device specifying information and the corresponding address information of the document attribute managing device 7 may be also collectively referred to as document attribute managing device information.

When the address information respectively showing the addresses of the devices on the information communication path 9 is included in the document attribute managing information and attached to the output medium P, the specifying information of the corresponding devices does not need to be respectively included in the document attribute managing information and attached to the output medium P, because the corresponding devices can be specified by the address information.

When the address information for specifying respectively the addresses of the devices on the information communication path 9 is not attached to the output medium P, an arrangement (specifically, a database) for managing the information for exclusively specifying the devices respectively and the address information of the devices in coordination is provided in the discarding device 4, the discard certificate issuing device 6 or the document attribute managing device 7 or the document managing server 8.

Then, when the discarding process of the output medium P is carried out in the discarding device 4, the discard certificate issuing device 6 that receives the information from the discarding device 4 issues the discard certificate and the document attribute managing device 7 updates the managing information. The discard certificate may be issued in the form of electronic data (document data of the discard certificate) or by outputting the discard certificate to the output medium P such as the printing sheet.

When the discard certificate is outputted to the output medium P, the image forming device 2 may have a function of the discard certificate issuing device 6 and the image forming device 2 itself carrying out the output process of the output medium P may issue the discard certificate, or another image forming device 2 may issue the discard certificate.

Further, after the discarding process in the discarding device 4 or the issuing process of the discard certificate in the discard certificate issuing device 6 are completed, when the registered state of the document or a request for reissuing the discard certificate is received from the device except the discarding device 4 (the image forming device 2, other discard certificate issuing device 6, the document attribute managing device 7), the document attribute managing device 7 informs other device that the discarding process is already finished or the discard certificate is already issued. Other device receiving this information instructs the prescribed discard certificate issuing device 6 to issue the discard certificate in accordance with the instruction of the user. The discard certificate issuing device 6 issues the discard certificate in accordance with the instruction of the user through each of the devices.

At this time, when the device information of the document attribute managing device 7 for registering and managing the document attribute managing information is registered and managed in the device itself, the address information of the document attribute managing device 7 is specified by using the registered information. Namely, the devices except the discarding device 4 respectively inquire about the document to be searched or instruct to reissue the discard certificate and further register the device information by themselves.

Otherwise, when the device information of the document attribute managing device 7 for registering and managing the document attribute managing information is registered in the discarding device 4, the address information of the document attribute managing device 7 is specified by using the registered information. That is, the devices except the discarding device 4 respectively inquire about the document to be searched or instruct to reissue the discard certificate. The device information is registered by the discarding device 4 and the devices respectively inquire the discarding device 4 about the document.

Further, after the discarding process in the discarding device 4 or the issuing process of the discard certificate in the discard certificate issuing device 6 are completed, when the registered state of the document or a request for reissuing the discard certificate is received from the discarding device 4, the document attribute managing device 7 informs the discarding device 4 that the discarding process is already finished or the discard certificate is already issued. The discarding device 4 receiving this information instructs the prescribed discard certificate issuing device 6 to issue the discard certificate in accordance with the instruction of the user. The discard certificate issuing device 6 issues the discard certificate in accordance with the instruction of the user through the discarding device 4. That is, the discarding device 4 inquires about the document to be searched or instructs to reissue the discard certificate and further registers the device information.

In the structure of the system of this embodiment, when the purpose of use of the confidential document such as an inspection is attained, the confidential document is discarded by the user in the discarding device 4. The discarding device 4 reads the document attribute managing information attached to the output medium P by a document attribute reading part to register in the document attribute managing device 7 that the confidential document is discarded in coordination with the document attribute managing information. In the system having the document managing server 8, this registering process may be carried out by the document managing server 8. At this time, the discard certificate issuing device 6 issues the discard certificate. After that, when there is a request for issuing the discard certificate (an actual reissue request), the result of the above-described registering process in the document attribute managing device 7 is recognized to issue the discard certificate. Thus, the issuance of the discard certificate is managed as well as the output to the discard of the confidential document.

(Attaching Example of Document Attribute Managing Information)

Figure 2:
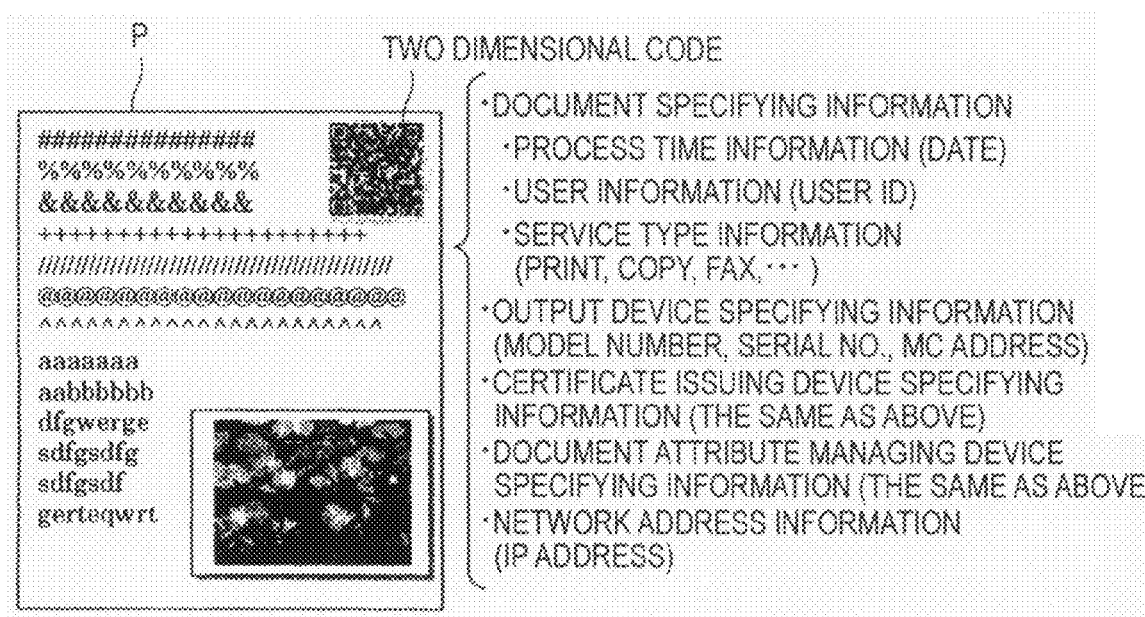
FIG. 2 is a diagram showing a method for attaching document attribute managing information to an output medium.

FIG. 2 is a diagram for explaining a method for attaching the document attribute managing information to the output medium P.

As described above, in this embodiment, when the document is printed on the output medium P by the image forming device 2, the document attribute managing information is attached to the output medium P on which the document is outputted.

As long as the document attribute managing information can be recognized during the discarding process, any of arrangements for attaching the document attribute managing information may be employed. On all the surface or a part of the output medium P, for instance, character information, a bar code (not limited to a one-dimensional bar code and includes a two-dimensional bar code), an electronic watermark, an IC tag or a non-contact IC chip (an electronic tag) also called a radio tag (RF ID; Radio Frequency Identification) may be formed and used.

Then, when the output medium P is conveyed, the output medium P including the document attribute managing information may be read by various kinds of methods such as an optical method, a magnetic method or an electro-magnetic method without coming into contact therewith. Then, the document attribute managing information may be extracted and the extracted document managing information may be analyzed.

In a reading method using the optical method, when the output medium P including the document attribute managing information in the form of the character information, the bar code, ID information or the electronic watermark is recorded in the output medium P as image information, the document attribute managing information is read by scanning the output medium P in a conveying process by light like an ordinary scanner device.

In a reading method using the magnetic method, when the output medium P including the document attribute managing information is incorporated and recorded on the output medium P with magnetic information, the magnetic information is read by using a magnetic sensor to obtain the document attribute managing information. When the magnetic information is incorporated and recorded on the output medium P, a construction similar to that of a magnetic card may be used, however, a method may be used in which a plurality of metal wires are arranged in the same way as that of the bar code to coordinate code information showing the document attribute managing information with a magnetized state of each of the metal wires.

In a reading method using the electro-magnetic method, when the document attribute managing information is incorporated and recorded on the output medium P in the form of the electronic tag, the information recorded on the tag is read by using a non-contact electric power transmitting technology such as a radio wave or an electro-magnetic wave to obtain the document attribute managing information.

FIG. 2 illustrates an example showing that the document attribute managing information is attached to the output medium P by the two-dimensional bar code. As the two-dimensional bar code, for instance, a QR code (Quick response Code) may be used.

While the one-dimensional bar code represents information only by the arrangement of bars such as the thickness of the bar and spaces between the bars, the two-dimensional code including the OQ code is a matrix type code in which the same number of small square dots are arranged lengthwise and breadth-wise.

When the document attribute managing information is attached to the output medium P during outputting the document to the output medium P by the image forming device 2, the document may be printed on the output medium P on which the document attribute managing information is previously recorded by the bar code or the electronic tag by a managing information writing device different from the image forming device 2. Otherwise, the image forming device 2 may be provided with a function part of the managing information writing device such as a managing information adding module or a managing information recording part, and when the confidential document is outputted by the image forming device 2, the document attribute managing information may be formed to print the bar code or write code data in the electronic tag.

Now, an operation of the document managing system 1 of this embodiment will be described in accordance with a specific example.

First Embodiment

Structure of System

Figure 3:
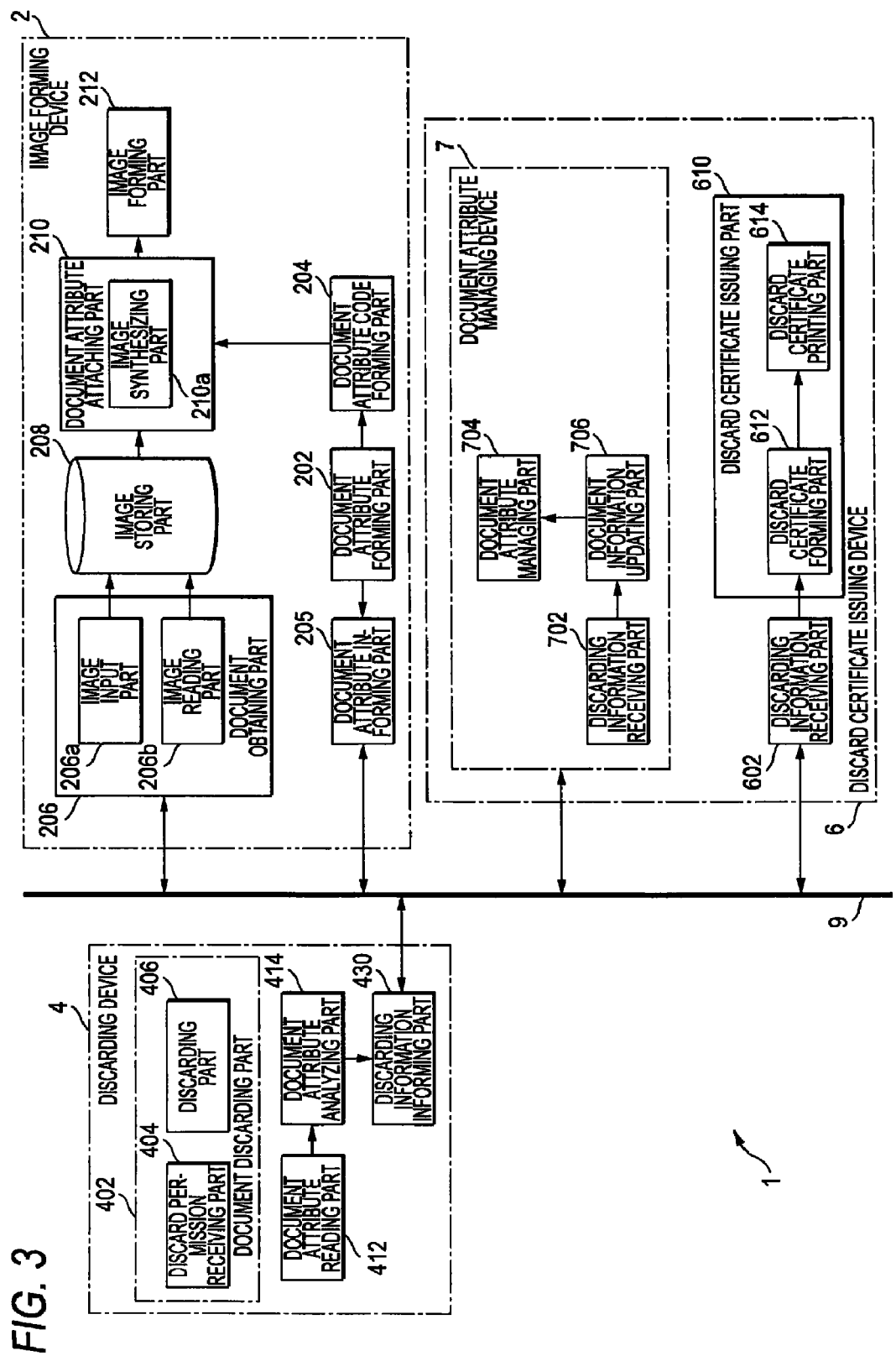
FIG. 3 is a functional block diagram (a basic structure) showing a structural example of a first embodiment of the document managing system according to the present invention.
Figure 4:
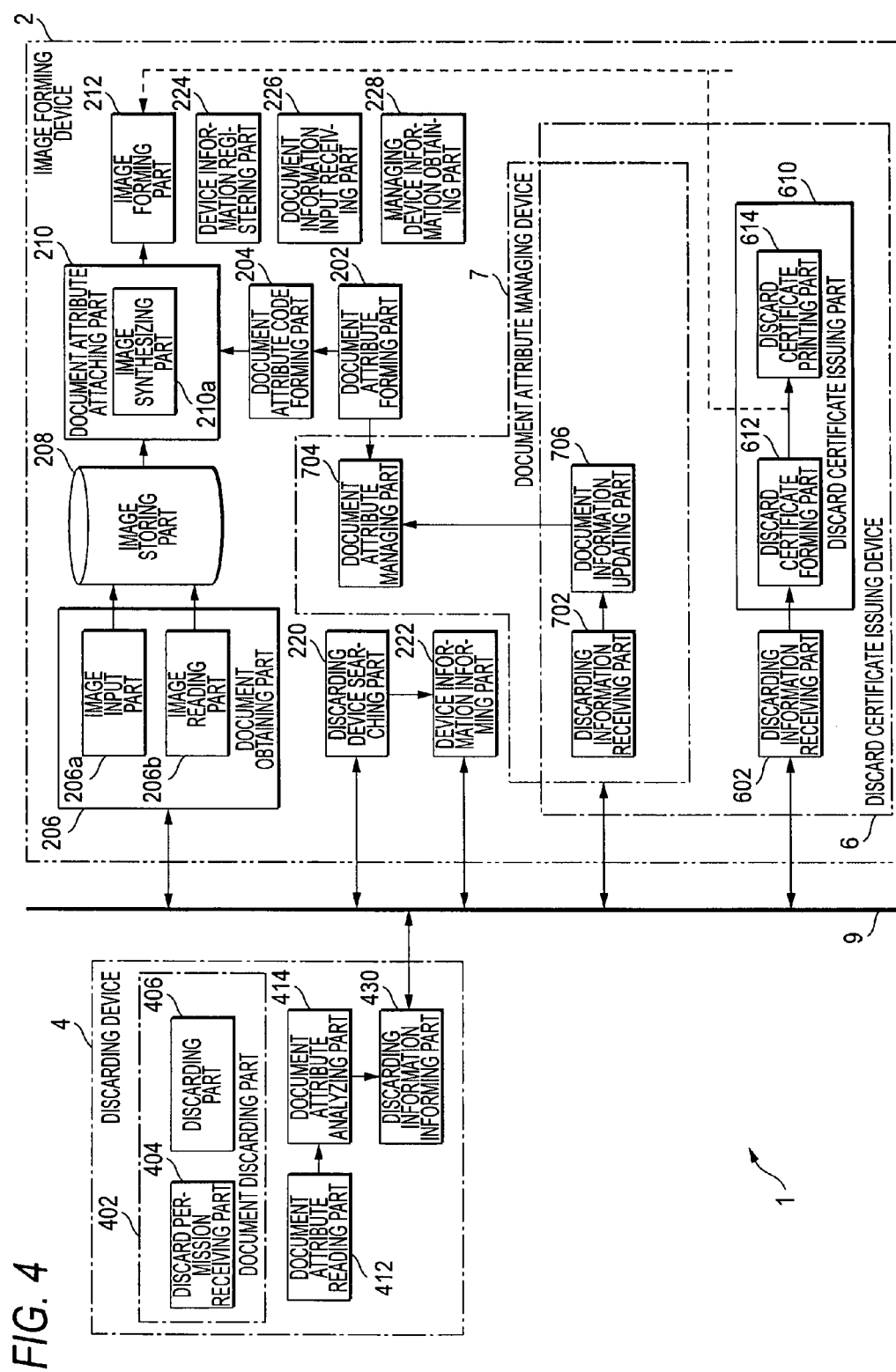
FIG. 4 is a functional block diagram (a modified structure) showing a structural example of the first embodiment of the document managing system according to the present invention.

FIGS. 3 and 4 are functional block diagrams showing structural examples of the first embodiment of the document managing system according to the present invention. A feature of the document managing system 1 of the first embodiment resides in a point that the certificate issuing device specifying information (in this embodiment, the IP address) for specifying the address of the image forming device 2 on the information communication path 9 is included in the document attribute managing information and attached to the output medium P.

In a basic structure shown in FIG. 3, the image forming device 2 for outputting the confidential document to the output medium P is provided separately from the discard certificate issuing device 6 for issuing the discard certificate in the structure of the system. However, like a modified structure shown in FIG. 4, the structure of the system may be formed in such a way that the image forming device 2 itself outputting the confidential document has a function of the discard certificate issuing device 6.

For instance, in the document managing system 1 of the first embodiment, the image forming device 2 for outputting the document to the output medium P and the discarding device 4 for discarding the document outputted from the image forming device 2 are connected together on a 1 to 1 basis or by the information communication path through the communication network. When the image forming device 2 and the discarding device 4 are connected together through the communication network, the document managing server 8 may be provided.

The image forming device 2 includes a document attribute forming part 202 for forming the document attribute managing information such as the document specifying information (the process time information (the date), the user information (the user ID), the service type information (print, copy, FAX, . . . )), the output device specifying information (the model number the serial number or the MAC address, etc.), the certificate issuing device specifying information, the document attribute managing device specifying information for each document to be processed (an image of the document), a document attribute code forming part 204 for encoding the document attribute managing information formed in the document attribute forming part 202, that is, converting the document attribute managing information to code data, a document attribute informing part 205 for informing the document attribute managing device 7 of the document attribute managing information formed by the document attribute forming part 202.

When the document attribute forming part 202 forms the output device specifying information (the MAC address) or the certificate issuing device specifying information (the IP address), the document attribute forming part 202 may inquire of function parts within the device itself for managing them to obtain the specifying information.

Further, the image forming device 2 includes a document obtaining part 206 for obtaining the document to be outputted and an image storing part 208 functioning as a virtual document storing part for converting the document obtained by the document obtaining part 206 to image data and storing the image data in a prescribed storing medium such as a hard disk device.

When as the document obtaining part 206, a structure is employed including a printing function, a fax function or an outputting function of the document stored in another storing medium, an image input part 206a is provided. Further, when a structure including a copying function is employed, an image reading part 206b is provided.

Further, the image forming device 2 includes a document attribute attaching part 210 for attaching the code data of the document attribute managing information formed by the document attribute code forming part 204 to the document (specifically, the image of the document) stored in the image storing part 208 and an image forming part 212 for forming the document on the output medium P.

In this embodiment, the document attribute attaching part 210 is provided with an image synthesizing part 210a for converting the code data of the document attribute managing information formed by the document attribute code forming part 204 to a two-dimensional code as shown in FIG. 2 to synthesize the two-dimensional code with the image of the document stored in the image storing part 208.

The discard certificate issuing device 6 includes a discarding information receiving part 602 for receiving from the discarding device 4 information (refer it to also as discarding information, hereinafter) of the discarding process including at least the document specifying information and information showing whether or not the document specified by the document specifying information is already discarded, and a discard certificate issuing part 610 for issuing the discard certificate when the document specifying information received by the discarding information receiving part 602 includes the information showing that the document is already discarded, that is, the document specified by the document specifying information is already discarded.

The discard certificate issuing part 610 includes a discard certificate forming part 612 for forming the electronic data of the discard certificate and a discard certificate printing part 614 for printing (outputting) the discard certificate to the output medium P in accordance with the electronic data of the discard certificate formed by the discard certificate forming part 612.

When the image forming device 2 has a function of the discard certificate issuing device 6 in the structure of the system as in this embodiment, the discard certificate printing part 614 may be removed and the image forming part 212 may serve as the discard certificate printing part 614.

The document attribute managing device 7 includes a discarding information receiving part 702 for receiving from the discarding device 4 the discarding information including at least the document specifying information and information showing whether or not the document specified by the document specifying information is already discarded, a document attribute managing part 704 for storing and managing the document attribute managing information formed in the document attribute forming part 202 and informed through the document attribute informing part 205 in the prescribed storing medium such as the hard disk device, and a document information updating part 706 for updating (revising) the document state in accordance with the discarding information received by the discarding information receiving part 702.

In the basic structure, the discard certificate issuing device 6 includes all the functions of the document attribute managing device 7 in the system, however, the document attribute managing device 7 may be provided independently of the discard certificate issuing device 6.

When the document attribute managing part 704 stores the document attribute managing information, the document attribute managing part 704 sets the document state to a "non-discard (presence)". In the structure of the system having the document managing server 8, the document attribute managing part 704 may be provided in the document managing server 8. Further, in the structure of the system having the document managing server 8, the document information updating part 706 may be provided in the document managing server 8. This is the same as the case where the document attribute managing part 704 is provided in the document managing server 8.

In realizing the basic construction for managing the issuance of the discard certificate in addition to the output to the discard of the document, since the certificate issuing device specifying information (the IP address) is included in the document attribute managing information in this embodiment, the output device specifying information (the MAC address) for specifying the image forming device 2 outputting the document does not need to be included in the document attribute managing information.

However, as in this embodiment, when the structure is employed that the document attribute managing information formed in the document attribute forming part 202 is managed by the document attribute managing part 704, the managing state of document information is updated in association with the discarding process in the discarding device 4. Accordingly, in order to specify the image forming device 2 having the document attribute managing part 704 for managing the document information, the output device specifying information for specifying the image forming device 2 carrying out the output process of the document or the document attribute managing device specifying information such as the IP address (the address information) for specifying the address of the image forming device 2 on the information communication path 9 may be included in the document attribute managing information and attached to the output medium P.

When partners to be connected can be exclusively specified, for instance, the devices 2, 4, 6 and 7 are respectively connected on a 1 to 1 basis, and the discarding device 4 side can specify the device as the partner for communication without using the device specifying information, the device specifying information or the address information corresponding thereto may not be respectively attached to the output medium P.

When the structure of the system is employed that the document attribute managing part 704 is not provided in the image forming device 2, but provided in the document managing server 8, the document attribute managing device specifying information for specifying the address of the document managing server 8 having the document attribute managing part 704 on the information communication path 9 is included in the document attribute managing information and attached to the output medium P. However, when the discarding device 4 side can specify the document managing server 8 without using the document attribute managing device specifying information, for instance, one document managing server 8 is provided, the document attribute managing device specifying information or the address information corresponding thereto does not need to be attached to the output medium P.

In this embodiment, both the basic structure and the modified structure include the discarding information receiving part 702 and the document information updating part 706 in the document attribute managing device 7 in the discard certificate issuing device 6. In this case, the discarding information receiving part 602 and the discarding information receiving part 702 may be collected together in one.

Further, in the modified structure that the image forming device 2 includes the function of the discard certificate issuing device 6 or the document attribute managing device 7, a structural example is provided that the document attribute managing part 704 is provided in the image forming device 2 side as its original position and the discarding information receiving part 702 and the document information updating part 706 are provided in the discard certificate issuing device 6 side. In this case, the document attribute informing part 205 for informing the document attribute managing device 7 of the document attribute managing information formed in the document attribute forming part 202 is not necessary.

It is to be understood that the document attribute managing device 7 may be formed independently of the image forming device 2 or the discard certificate issuing device 6.

When the document specifying information received by the discarding information receiving part 702 includes information showing that the document is already discarded, that is, the document specified by the document specifying information is already discarded, the document information updating part 706 searches the document attribute managing part 704 to make the document nullified. For instance, the "non-discard (presence)" during registering the information is updated to the "discard".

At this time, the image storing part 208 may nullify the stored image data of the document in association therewith. Here, to nullify the image data of the document means that the image data of the document cannot be treated within at least a range of the operation of an ordinary user. This may be limited to a deletion of the image data from what is called a directory or the image data is completely deleted by overwriting another data thereon.

The discarding device 4 includes a document discarding part 402 for carrying out the discarding process of the document. The document discarding part 402 includes a discard permission receiving part 404 for receiving a discard permission and a discarding part 406 for discarding the document under a condition that the discard permission receiving part 404 receives the discard permission.

The discarding part 406 preferably includes a recovery device having, for instance, a recovery box for materials to be recycled, a recovery box for materials to be discarded and a shredder for shredding a medium having a prescribed size. The shredder may be incorporated in the recovery device. Further preferably, an opening device for separating a fibrous material, a separator for carrying out a de-inking process and a paper machine for forming a regenerated paper may be included.

As the recovery box, a recovery box for recycling (using the back side of a sheet) and a recovery box for burning or burying sheets in the ground are preferably prepared so as to sort sheets whose one surfaces are printed and sheets both surfaces of which are printed as well as a recovery box for regenerating sheets.

In this embodiment, it is assumed that the document discarding part 402 receives the discard permission when the document is put into an input port of the recovery device whose illustration is omitted.

Further, the discarding device 4 includes a document attribute reading part 412 for reading, during the discarding process, the code data of the document attribute managing information attached to the output medium P on which the document is formed by the image forming device 2, a document attribute analyzing part 414 for analyzing the code data of the document attribute managing information read by the document attribute reading part 412 to restore original document attribute managing information and a discarding information informing part 430 for informing the image forming device 2 outputting the document to be discarded of the discarding information.

In the first embodiment, the discarding information informing part 430 refers to the address information specified by the analyzing process of the document attribute analyzing part 414 to inform the image forming device 2 outputting the document to be discarded, the discard certificate issuing device 6 or the document attribute managing device 7 of the discarding information.

As described above, the discarding device 4 of the first embodiment not only has a function for discarding the document, but also obtains the code data of the document attribute managing information formed on the output medium P, analyzes the code data of the obtained document attribute managing information and informs the discard certificate issuing device 6 for issuing the discard certificate of the document to be discarded, the document attribute managing device 7 or the image forming device 2 having these functions of the document specifying information in accordance with the analyzed address information.

First Embodiment

Processing Procedure

Figure 5:
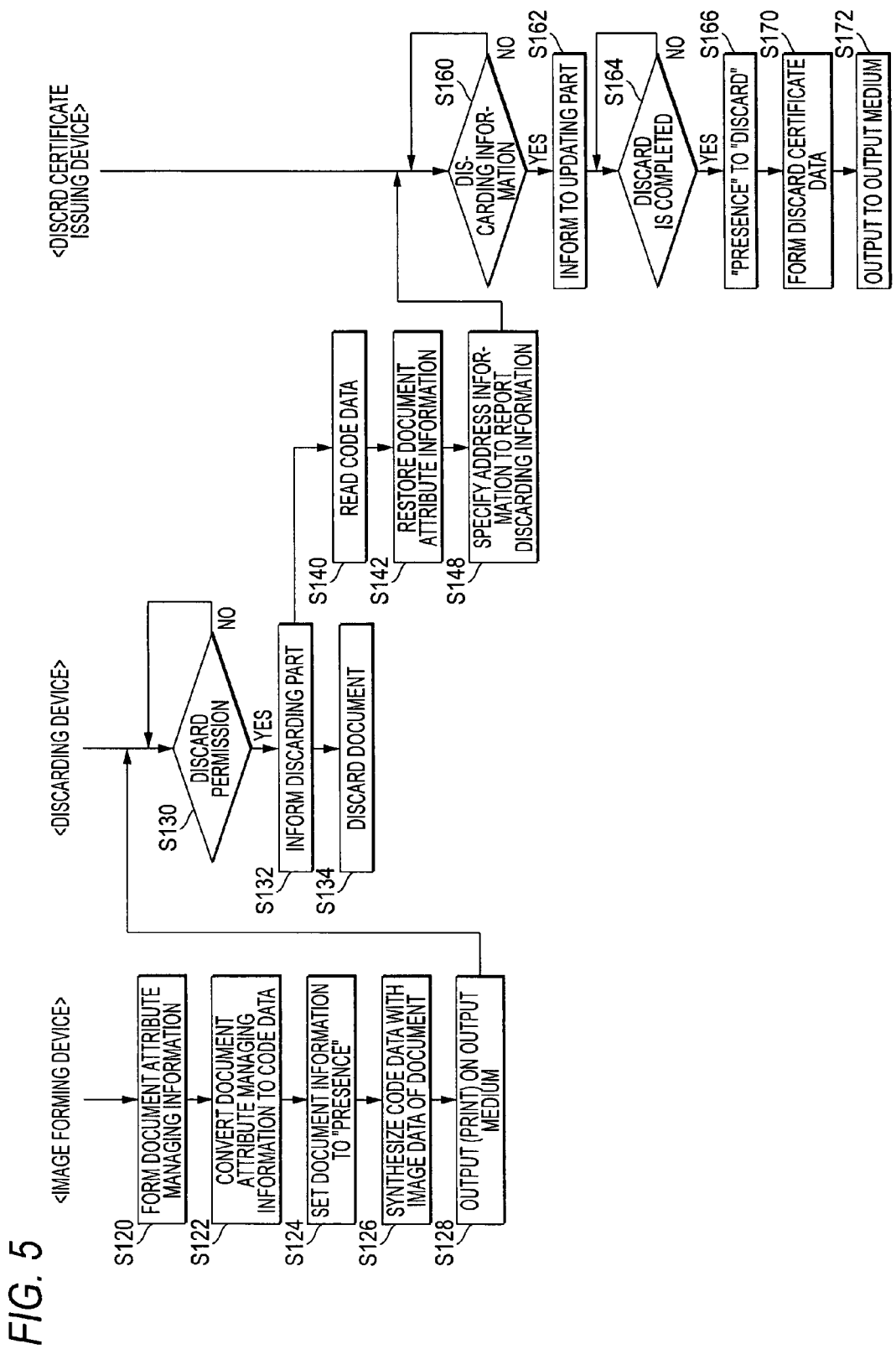
FIG. 5 is a flowchart showing one example of a processing procedure in the document managing system (the basic structure) of the first embodiment.
Figure 6:
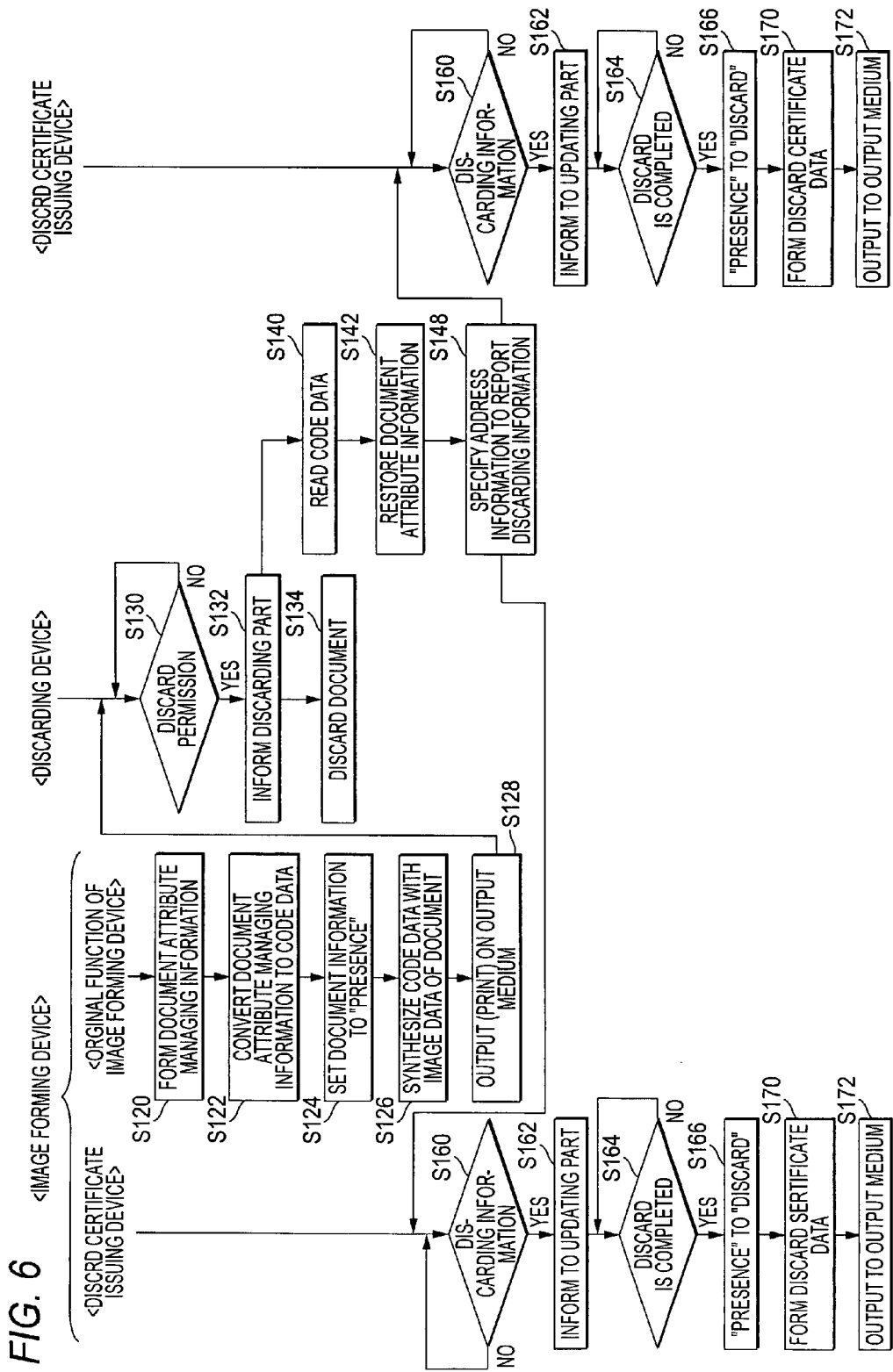
FIG. 6 is a flowchart showing one example of a processing procedure in the document managing system (the modified structure) of the first embodiment.

FIGS. 5 and 6 are flowcharts showing one example of a processing procedure in the document managing system 1 of the first embodiment. Here, FIG. 5 shows the procedure of the structure of the system shown in FIG. 3 and FIG. 6 shows the procedure of the structure of the system shown in FIG. 4. In this case, the image forming device 2 itself or another discard certificate issuing device 6 issues the discard certificate.

The image forming device 2 forms in the document attribute forming part 202 the certificate issuing device specifying information (in this embodiment, the IP address is used in place thereof) that can specify the discard certificate issuing device 6 for issuing the discard certificate in the discarding device 4 side during outputting the document to the output medium P to collect the certificate issuing device specifying information together with the document specifying information as the document attribute managing information (S102) and converts the document attribute managing information to the code data in the document attribute code forming part 204 (S122).

The IP address of the discard certificate issuing device 6 is used in place of the certificate issuing device specifying information, because the discarding device 4 side does not require information for exclusively specifying the discard certificate issuing device 6 itself, but requires the address information showing the destination to which the discarding information is reported on the information communication path 9.

When the structure of the system is employed that the document attribute managing part 704 is not provided in the image forming device 2, but provided in the document managing server 8, the document attribute managing device specifying information (in this embodiment, the IP address is used in place thereof) for specifying the address of the document managing server 8 having the document attribute managing part 704 on the information communication path 9 is included in the document attribute managing information and attached to the output medium P.

The IP address of the document attribute managing device 7 is used in place of the document attribute managing device specifying information, because the discarding device 4 side does not require information for exclusively specifying the document attribute managing device 7 itself, but requires the address information showing the destination to which the discarding information is reported on the information communication path 9.

Further, the document attribute managing part 704 sets the document state to the "non-discard (presence)" to store the document attribute managing information (S124). The document attribute attaching part 210 synthesizes the code data of the document attribute managing information with the image data of the document (S126) to output the synthesized data to the output medium P in the image forming part 212 (S128).

After the document is completely outputted to the output medium P by the image forming device 2, in the discarding device 4, when the discard permission receiving part 404 of the document discarding part 402 receives the discard permission as soon as the document is put into the input port of the recovery device (S130—YES), the discard permission receiving part informs the discarding part 406 of that information (S132). The discarding part 406 discards the document under the condition that the discard permission receiving part 404 receives the discard permission (S134).

In association with the discarding process, the document attribute reading part 412 reads the code data of the document attribute managing information attached to the output medium P supplied to the discarding process during the process that the document is put into the input port of the recovery device and discarded in the discarding part 406 and delivers the read information to the document attribute analyzing part 414 (S140).

The document attribute analyzing part 414 analyzes the code data of the document attribute managing information read by the document attribute reading part 412 to restore the original document attribute managing information and deliver the information to the discarding information informing part 430 (S142).

The discarding information informing part 430 refers to the certificate issuing device specifying information (the IP address) specified by the document attribute managing information received from the document attribute analyzing part 414 to inform the discard certificate issuing device 6 for issuing the discard certificate of the discarding information (S148). As shown in FIG. 6, in the structure of the system that the image forming device 2 itself for outputting the document has a function of the discard certificate issuing device 6, the discard certificate issuing device 6 provided in the image forming device 2 may be informed of the discarding information.

In other words, the discarding device 4 reads, during the discarding process, the document attribute managing information from the output medium P on which the document is formed, obtains the certificate issuing device specifying information for specifying the discard certificate issuing device 6 for issuing the discard certificate in accordance with the document attribute managing information and informs the discard certificate issuing device 6 specified by the certificate issuing device specifying information of the document specifying information for exclusively specifying the document to be discarded.

In the discard certificate issuing device 6, when the discarding information is received by the discarding information receiving part 602 (S160—YES), the discarding information receiving part informs the document information updating part 706 of the discarding information (S162). The document information updating part 706 firstly decides whether or not the document specifying information received by the discarding information receiving part 602 includes information showing that the document is already discarded, that is, whether or not the document specified by the document specifying information is already discarded (S164).

When the document specified by the document specifying information is already discarded (S164—YES), the document information updating part 706 searches the document attribute managing part 704 to update the registered state of the document information to the "discard" from the "non-discard (presence)" (S166).

In association with the updating process of the registered state, the discard certificate forming part 612 forms the electronic data of the discard certificate and delivers the electronic data to the discard certificate printing part 614 (S170). The discard certificate printing part 614 prints (outputs) the discard certificate on the output medium P in accordance with the electronic data of the discard certificate formed by the discard certificate forming part 612 (S172). The discard certificate is not necessarily printed in the output medium P. The electronic data of the discard certificate formed by the discard certificate forming part 612 may be stored and provided in the form of a file on a storing medium such as a flexible disk.

Second Embodiment

Structure of System

Figure 7:
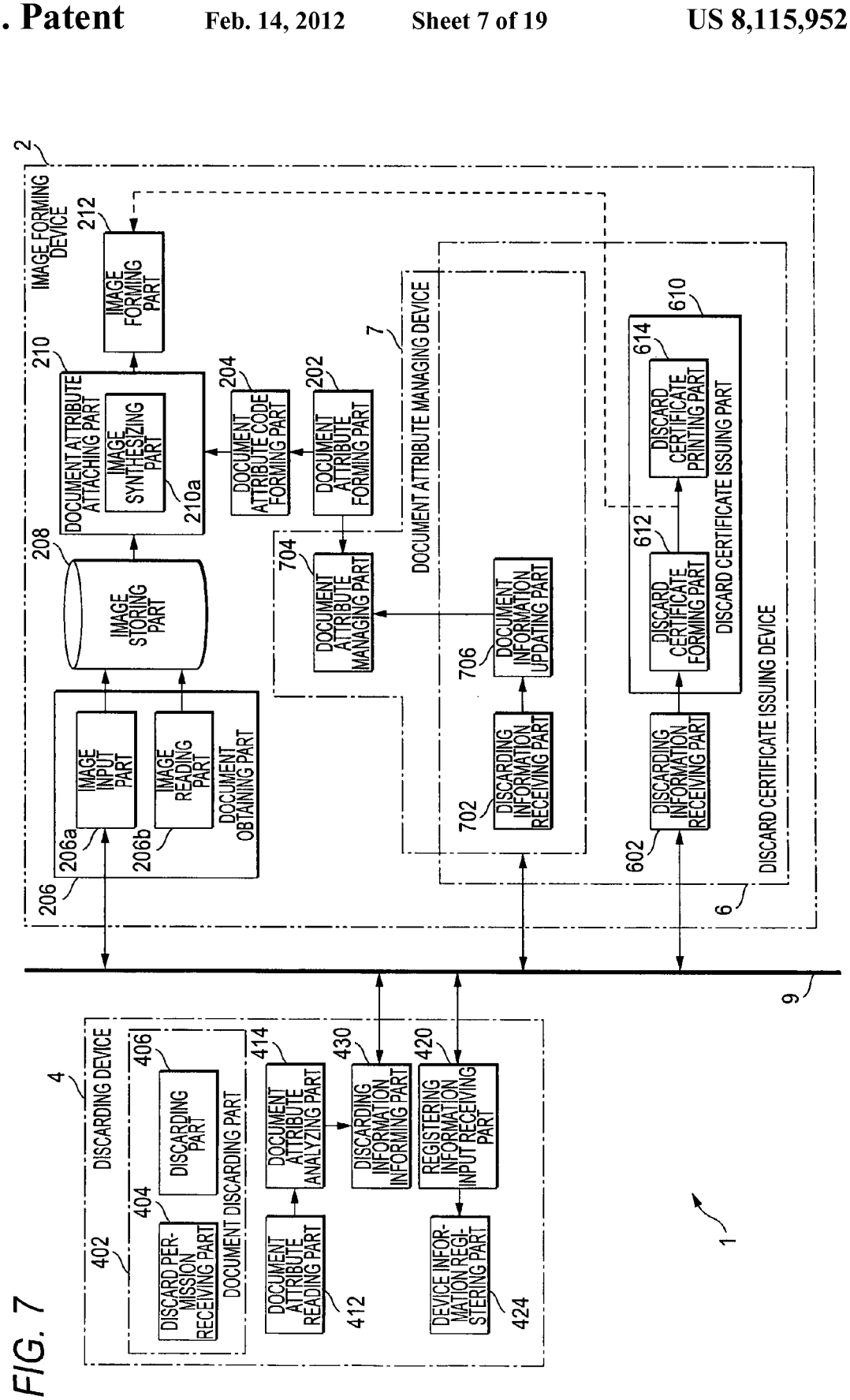
FIG. 7 is a functional block diagram showing a structural example of a second embodiment of the document managing system according to the present invention.

FIGS. 7 and 8 are diagrams for explaining a second embodiment of a document managing system according to the present invention. FIG. 7 is a functional block diagram showing a structural example of the second embodiment of the document managing system according to the present invention. Here, a modified example is shown relative to the structure of the system shown in FIG. 4 in which the image forming device 2 includes the function of the discard certificate issuing device 6. FIG. 8 is an explanatory diagram for explaining specifying information of devices respectively managed in a discarding device 4.

The document managing system 1 of the second embodiment is characterized in that an image forming device 2 includes output device specifying information, document specifying information, certificate issuing device specifying information and document attribute managing device specifying information (any of them indicates a model number, a serial number or a MAC address, etc for specifying a device) except address information showing addresses of the devices on an information communication path 9 corresponding to the certificate issuing device specifying information or the document attribute managing device specifying information in document attribute managing information and attaches the document attribute managing information to an output medium P, and the discarding device 4 registers and manages the address information of the devices respectively corresponding to the device specifying information such as the certificate issuing device specifying information or the document attribute managing device specifying information.

Especially, as a different point of the second embodiment from a below-described third embodiment, the second embodiment is characterized in that a user (a manager of the system) registers the device specifying information such as the certificate issuing device specifying information or the document attribute managing device specifying information or the address information corresponding thereto. Now, differences from the first embodiment will be mainly described below.

In the document managing system 1 of the second embodiment, the image forming device 2 is the same as the modified structure of the first embodiment in view of the structure of the device.

On the other hand, the discarding device 4 of the second embodiment includes, in addition to the structure of the first embodiment, a device information registering part 424 for storing and managing the device specifying information such as the certificate issuing device specifying information or the document attribute managing device specifying information and the address information corresponding thereto in a prescribed storing medium such as a hard disk.

Further, as a different point from the below-described third embodiment, the discarding device 4 includes a registering information input receiving part 420 for receiving an input of registering information by the user (for instance, a manager of the system. The registering information includes the certificate issuing device specifying information and an IP address as the address information for specifying a discard certificate issuing device 6 on the information communication path 9 corresponding thereto, and the document attribute managing device specifying information and an IP address as the address information for specifying the address of a document attribute managing device 7 on the information communication path 9 corresponding thereto.

The registering information input receiving part 420 receives the operation of an operating key provided in an operating panel whose illustration is omitted by the user to register coordinately the certificate issuing device specifying information and the corresponding IP address or the document attribute managing device specifying information and the corresponding IP address.

As shown in FIG. 8A, the device information registering part 424 firstly stores the certificate issuing device specifying information (for instance, the model number, the serial number or the MAC address of the discard certificate issuing device 6) for exclusively specifying the discard certificate issuing device 6 and the IP address for specifying the address of the discard certificate issuing device 6 on the information communication path 9 in coordination.

When the image forming device 2 employs the structure of the system including a function of the discard certificate issuing device 6, it is to be understood that the device information registering part 424 stores the certificate issuing device specifying information (for instance, the model number, the serial number or the MAC address of the imager forming device 2) for exclusively specifying the image forming device 2 having the function of the discard certificate issuing device 6 and the IP address for specifying the address of the image forming device 2 on the information communication path 9 in coordination.

As shown in FIG. 8B, the device information registering part 424 stores the document attribute managing device specifying information (for instance, the model number, the serial number or the MAC address of the document attribute managing device 7) for exclusively specifying the document attribute managing device 7 including a document attribute managing part 704 or a document information updating part 706 in coordination with the IP address for specifying the address of the document attribute managing device 7 on the information communication path 9.

When the structure of the system is employed that the document attribute managing part 704 or the document information updating part 706 is provided in a document managing server 8, it is to be understood that the device information registering part 424 stores the document attribute managing device specifying information (for instance, the MAC address of the document managing server 8) for exclusively specifying the document managing server 8 in coordination with the IP address for specifying the address of the document managing server 8 on the information communication path 9.

When the structure of the system is employed that the image forming device 2 has the function of the discard certificate issuing device 6 and the document attribute managing device 7 including the document attribute managing part 704 or the document information updating part 706 is provided in the image forming device 2, since the certificate issuing device specifying information is common to the document attribute managing device specifying information and the output device specifying information serves as these information at the same time, as shown in FIG. 8C, the output device specifying information (for instance, the model number, the serial number or the MAC address of the image forming device 2) for exclusively specifying the image forming device 2 may be stored in coordination with the IP address for specifying the address of the image forming device 2 on the information communication path 9.

A discarding information informing part 430 of the second embodiment matches the device specifying information of the image forming device 2, the discard certificate issuing device 6 or the document attribute managing device 7 respectively specified by an analyzing process of a document attribute analyzing part 414 with the registering information managed by the device information registering part 424 to specify respectively the address information of the devices. The discarding information informing part 430 refers to the address information to inform the image forming device 2 outputting a document to be discarded, the discard certificate issuing device 6 or the document attribute managing device 7 of discarding information.

As described above, the discarding device 4 of the second embodiment not only has a function for discarding the document, but also obtains the code data of the document attribute managing information formed on the output medium P, analyzes the code data of the obtained document attribute managing information, and further matches the analyzed device specifying information with the registering information in the device information registering part 424 to specify the address information and inform the discard certificate issuing device 6 for issuing the discard certificate of the document to be discarded or the document attribute managing device 7 or the image forming device 2 having the functions of them of document specifying information in accordance with the specified address information.

Second Embodiment

Processing Procedure

Figure 9:
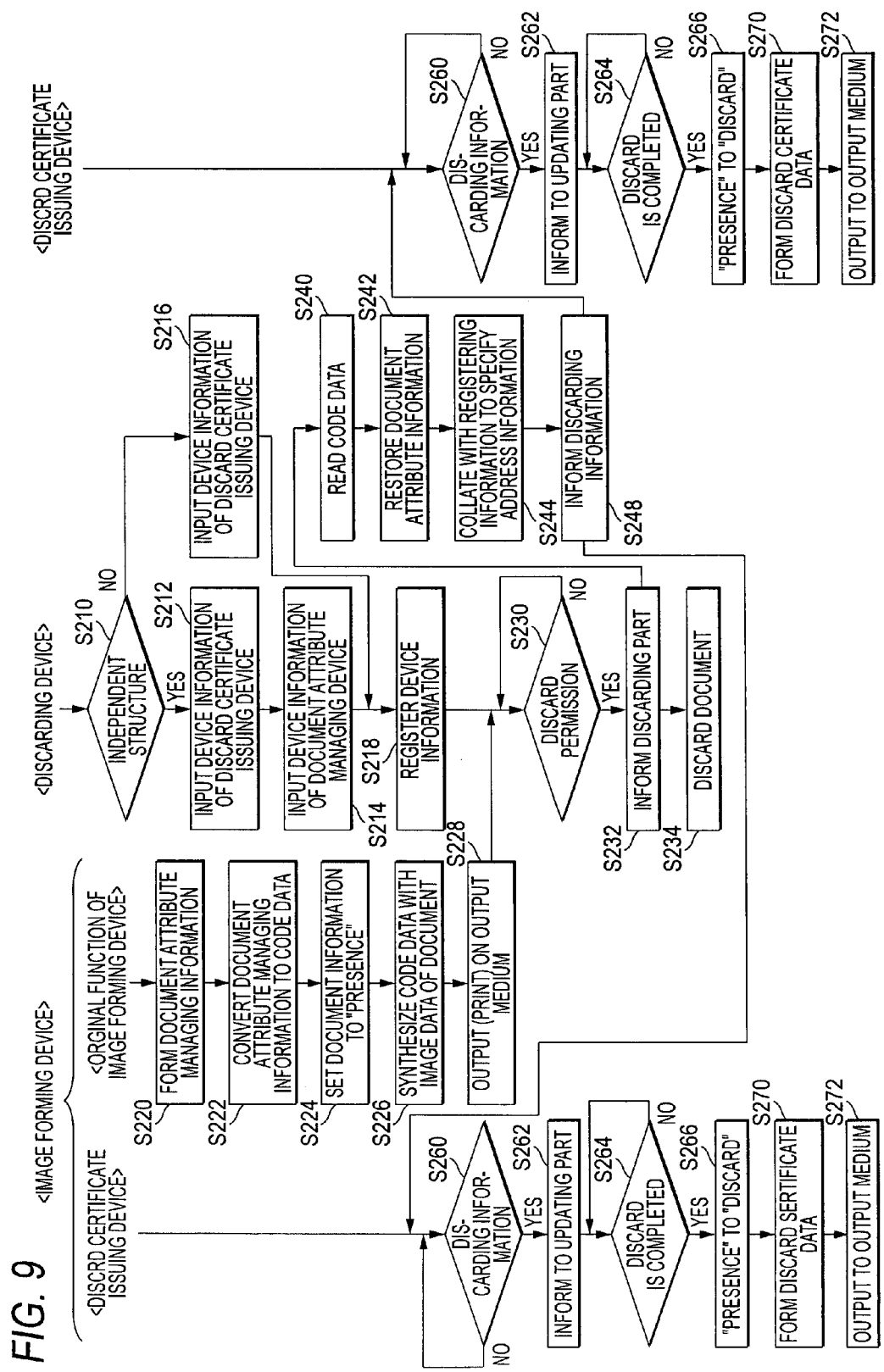
FIG. 9 is a flowchart showing one example of a processing procedure in the document managing system of the second embodiment.

FIG. 9 is a flowchart showing one example of a processing procedure in the document managing system 1 of the second embodiment. FIG. 9 shows a modified example to the processing procedure of the first embodiment shown in FIG. 6. Processing steps of the second embodiment are designated by numbers of the 200 level and the processing steps the same as or corresponding to those of the first embodiment are designated by numbers of the 10 level and the 1 level the same as those of the first embodiment. Now, different points from the first embodiment will be mainly described below.

Firstly in the discarding device 4, when the structure of the system is employed that the discard certificate device 6 or the document attribute managing device 7 is provided independently of the image forming device 2 (S210—YES), the user (for instance, the manager of the system) inputs the device information of the discard certificate issuing device 6, that is, the certificate issuing device specifying information of the discard certificate issuing device 6 and the IP address as the address information of the discard certificate issuing device 6 on the information communication path 9 corresponding thereto through the registering information input receiving part 420 (S212). Further, the user (for instance, the manager of the system) inputs the device information of the document attribute managing device 7, that is, the document attribute managing device specifying information of the document attribute managing device 7 and the IP address as the address information of the document attribute managing device 7 on the information communication path 9 corresponding thereto through the registering information input receiving part 420 (S214).

When the image forming device 2 has the function of the discard certificate issuing device 6 or the document attribute managing device 7 (S210—NO), the user inputs the device information of the image forming device 2 used in place of the certificate issuing device specifying information or the document attribute managing device specifying information, that is, the output device specifying information of the image forming device 2 and the IP address as the address information corresponding thereto through the registering information input receiving part 420 (S216).

When the device information registering part 424 receives the input of the user through the registering information input receiving part 420, the device information registering part 424 registers the certificate issuing device specifying information and the corresponding IP address and the document attribute managing device specifying information and the corresponding IP address inputted from the user in coordination respectively (S218).

The image forming device 2 forms, during the outputting process of the document to the output medium P, the certificate issuing device specifying information (in this embodiment, the model number, the serial number or the MAC address of the discard certificate issuing device 6) capable of specifying the discard certificate issuing device 6 for issuing a discard certificate in the discarding device side, in a document attribute forming part 202, collects the certificate issuing device specifying information together with the document specifying information to have the document attribute managing information (S220), converts the document attribute managing information into the code data in a document attribute code forming part 204 (S222) and attaches the code data to the output medium P (S228).

When the structure of the system is employed that the document attribute managing part 704 is not provided in the image forming device 2, but provided in the document managing server 8, the document attribute managing device specifying information (in this embodiment, the model number, the serial number or the MAC address of the document managing server 8) for specifying the document managing server 8 including the document attribute managing part 704 is included in the document attribute managing information and attached to the output medium P.

After the document is completely outputted to the output medium P by the image forming device 2, in the discarding device 4, when a discard permission receiving part 404 of a document discarding part 402 receives a discard permission as soon as the document is put into an input port of a recovery device (S230—YES), the discard permission receiving part informs a discarding part 406 of that information (S232). The discarding part 406 discards the document under the condition that the discard permission receiving part 404 receives the discard permission (S234).

In association with the discarding process, a document attribute reading part 412 reads the code data of the document attribute managing information attached to the output medium P supplied to the discarding process during the process that the document is put into the input port of the recovery device and discarded in the discarding part 406 and delivers the read information to the document attribute analyzing part 414 (S240).

The document attribute analyzing part 414 analyzes the code data of the document attribute managing information read by the document attribute reading part 412 to restore the original document attribute managing information and deliver the information to the discarding information informing part 430 (S242).

The discarding information informing part 430 matches the output device specifying information (the model number of the device) specified by the document attribute managing information received from the document analyzing part 414 with the registering information managed by the device information registering part 424 to specify the corresponding address information (S244). The discarding information informing part 430 refers to the specified address information to inform the discard certificate issuing device 6 for issuing the discard certificate (when the image forming device 2 itself outputting the document has the function of the discard certificate issuing device 6 in the structure of the system, the image forming device 2) of the discarding information (S248).

In other words, the discarding device 4 reads, during the discarding process, the document attribute managing information from the output medium P on which the document is formed, obtains the certificate issuing device specifying information for specifying the discard certificate issuing device 6 for issuing the discard certificate in accordance with the document attribute managing information and informs the discard certificate issuing device 6 specified by the certificate issuing device specifying information of the document specifying information for exclusively specifying the document to be discarded.

In the discard certificate issuing device 6, when the discarding information is received by a discarding information receiving part 602 (S260—YES), the discarding information receiving part informs the document information updating part 706 of the discarding information (S262). The document information updating part 706 firstly decides whether or not the received document specifying information received by the discarding information receiving part 602 includes information showing that the document is already discarded, that is, whether or not the document specified by the document specifying information is already discarded (S264).

When the document specified by the document specifying information is already discarded (S264—YES), the document information updating part 706 searches the document attribute managing part 704 to update the registered state of the document information to a "discard" from a "non-discard (presence)" (S266).

In association with the updating process of the registered state, a discard certificate forming part 612 forms the electronic data of the discard certificate and delivers the electronic data to a discard certificate printing part 614 (S270). The discard certificate printing part 614 prints (outputs) the discard certificate on the output medium P in accordance with the electronic data of the discard certificate formed by the discard certificate forming part 612 (S272). The discard certificate is not necessarily printed in the output medium P. The electronic data of the discard certificate formed by the discard certificate forming part 612 may be stored and provided in the form of a file on a storing medium such as a flexible disk.

Third Embodiment

Structure of System

Figure 10:
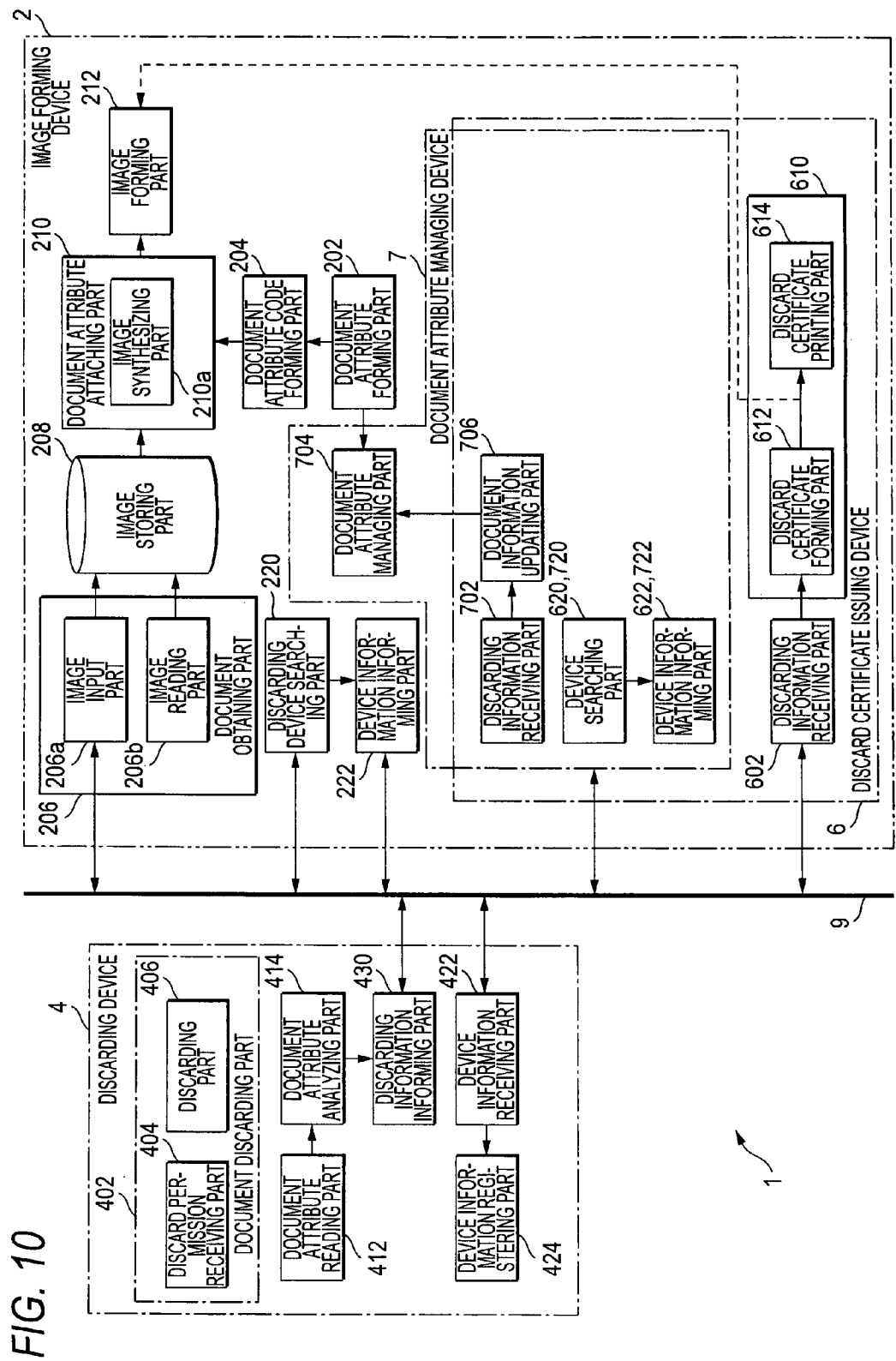
FIG. 10 is a functional block diagram showing a structural example of a third embodiment of the document managing system according to the present invention.

FIG. 10 is a functional block diagram showing a structural example of a third embodiment of a document managing system according to the present invention. Here, a modified example is shown relative to the structure of the system shown in FIG. 4 in which the image forming device 2 includes the function of the discard certificate issuing device 6.

The document managing system 1 of the third embodiment is characterized in that an image forming device 2 includes output device specifying information, document specifying information, certificate issuing device specifying information and document attribute managing device specifying information (any of them indicates a model number, a serial number or a MAC address, etc for specifying a device) except address information showing addresses of the devices on an information communication path 9 corresponding to the certificate issuing device specifying information or the document attribute managing device specifying information in document attribute managing information and attaches the document attribute managing information to an output medium P, and the discarding device 4 registers and manages the address information of the devices respectively corresponding to the certificate issuing device specifying information or the document attribute managing device specifying information.

Especially, as a different point of the third embodiment from the second embodiment, the third embodiment is characterized in that the device specifying information such as the certificate issuing device specifying information or the document attribute managing device specifying information or the corresponding address information is automatically registered without an operation of a user. Now, the different points of the third embodiment from the second embodiment will be mainly described below.

In the document managing system 1 of the third embodiment, firstly, an image forming device 2 includes a device searching part 220 for searching a discarding device 4 and a device information informing part 222 for informing the discarding device 4 of the device information of itself in addition to the structure of the first embodiment or the second embodiment.

The device searching part 220 informs the device information informing part 222 of a searched result. The device information informing part 222 coordinates the output device specifying information of the image forming device 2 with the address information to inform the discarding device 4 searched by the device searching part 220 of the coordinated information as output device information.

Further, a discard certificate issuing device 6 includes a device searching part 620 for searching the discarding device 4 and a device information informing part 622 for informing the discarding device 4 of the device information of itself.

The device searching part 620 informs the device information informing part 622 of a searched result. The device information informing part 622 coordinates the discard certificate issuing device specifying information of the discard certificate issuing device 6 with the address information to inform the discarding device 4 searched by the device searching part 620 of the coordinated information as discard certificate issuing device information.

Further, a document attribute managing device 7 includes a device searching part 720 for searching the discarding device 4 and a device information informing part 722 for informing the discarding device 4 of the device information of itself.

The device searching part 720 informs the device information informing part 722 of a searched result. The device information informing part 722 coordinates the document attribute managing device specifying information of the document attribute managing device 7 with the address information to inform the discarding device 4 searched by the device searching part 720 of the coordinated information as document attribute managing device information.

When the structure of the system is employed that the discard certificate issuing device 6 includes the function of the document attribute managing device 7, as shown in the drawing, the device searching parts 620 and 720 may be respectively collected together to one function part. Similarly, the device information informing parts 622 and 722 may be also respectively collected together to one function part. Further, in the structure of the system that the image forming device 2 includes the function of the discard certificate issuing device 6 or the document attribute managing device 7, the device searching parts 220, 620 and 720 may be collected together to one function part. Similarly, the device information informing parts 222, 622 and 722 may be collected together to one function part.

On the other hand, the discarding device 4 of the third embodiment includes a device information receiving part 422 for receiving the device information respectively transmitted from the device information informing parts 222, 622 and 722 in place of the registering information input receiving part 420 provided in the structure of the second embodiment.

The device information receiving part 422 coordinates and registers the received device information (the device specifying information of the devices and the address information) in a device information registering part 424.

Third Embodiment

Processing Procedure

Figure 11:
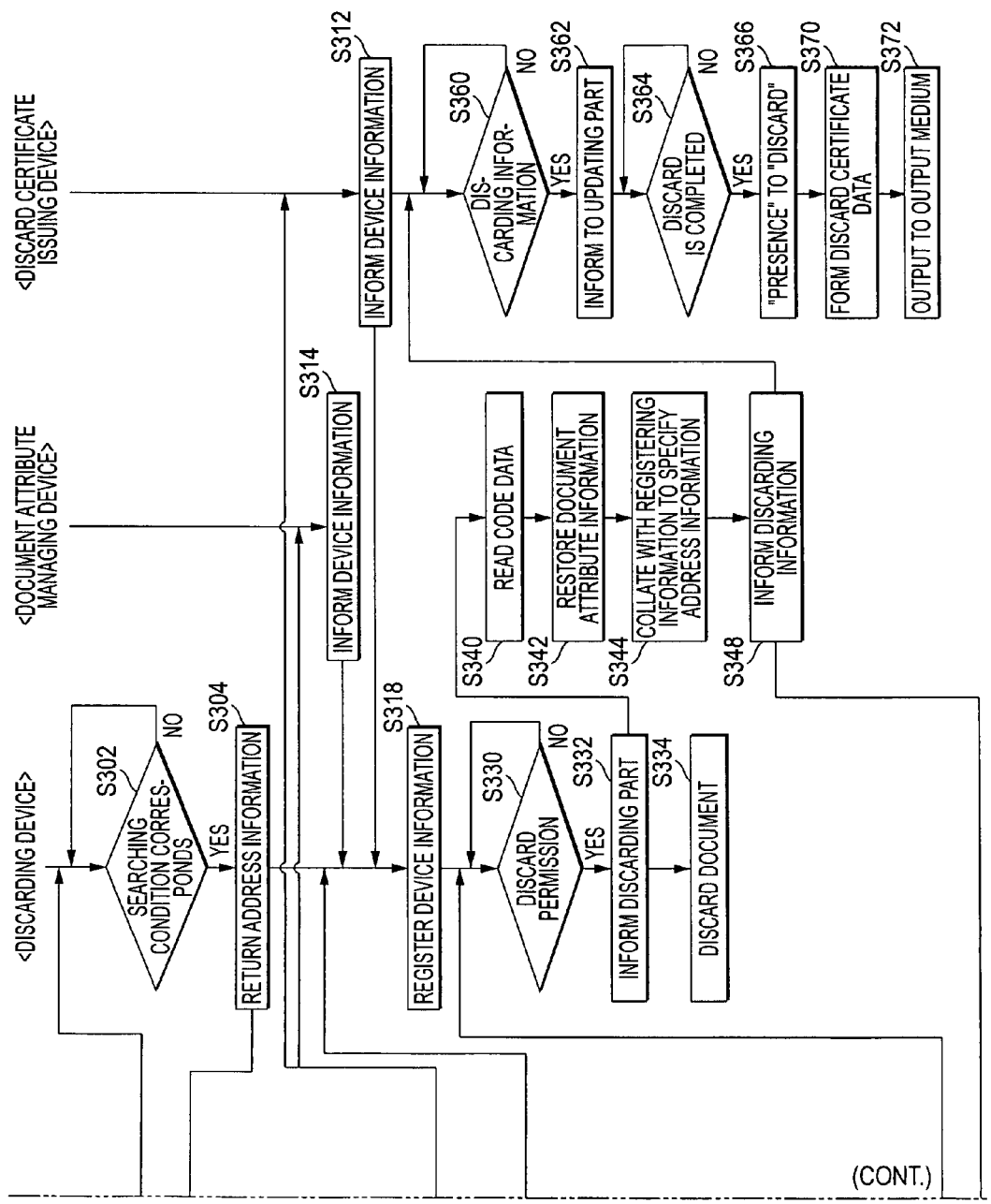
FIG. 11 is a flowchart showing one example of a processing procedure in the document managing system of the third embodiment.

FIG. 11 is a flowchart showing one example of a processing procedure in the document managing system 1 of the third embodiment. FIG. 11 shows a modified example to the processing procedure of the second embodiment shown in FIG. 9. Processing steps of the third embodiment are designated by numbers of the 300 level and the processing steps the same as or corresponding to those of the second embodiment are designated by numbers of the 10 level and the 1 level the same as those of the second embodiment. Now, different points from the second embodiment will be mainly described below.

Firstly, in the image forming device 2, the discard certificate issuing device 6 or the document attribute managing device 7, the device searching parts 220, 620 and 720 search the discarding device 4 in the document managing system 1 having a discarding process managing function to wait for a response from the discarding device 4 (S300, S306). This searching process may be realized by, for instance, a search using a goods code, a model number or a serial number of the discarding device 4 as a search key in a broadcast communication.

The discarding device 4 decides whether or not the search key such as the goods code transmitted by the broad cast communication corresponds to the goods code, the model number or the serial number of itself (S302). When they are corresponded to each other, the discarding device 4 returns the address information of itself (S302—YES, S304).

The device searching parts 220, 620 and 720 receiving the response of the address information (S306—YES) store the received response result (the address information of the discarding device 4) therein (S308).

In the structure of the system that the discard certificate issuing device 6 or the document attribute managing device 7 is provided independently of the image forming device 2 (S310—YES), the discard certificate issuing device 6 informs the responding discarding device 4 of the device information of the discard certificate issuing device 6, that is, the discard certificate issuing device specifying information and an IP address as the address information corresponding thereto through the device information informing part 622 (S312). Further, the document attribute managing device 7 informs the responding discarding device 4 of the device information of the document attribute managing device 7, that is, the document attribute managing device specifying information and an IP address as the address information corresponding thereto through the device information informing part 722 (S314).

When the image forming device 2 includes the function of the discard certificate issuing device 6 or the document attribute managing device 7 (S310—NO), the image forming device 2 informs the responding discarding device 4 of the device information of image informing device 2, that is, the output device specifying information used in place of the discard certificate issuing device specifying information or the document attribute managing device specifying information and an IP address as the address information corresponding thereto through the device information informing part 222 (S316).

When the device information registering part 424 receives the device specifying information and the address information corresponding thereto through the device information receiving part 422, the device information registering part 424 coordinates the device specifying information with the address information corresponding thereto and registers the information (S318). Other processes are the same as those of the second embodiment.

Fourth Embodiment

Structure of System

Figure 12:
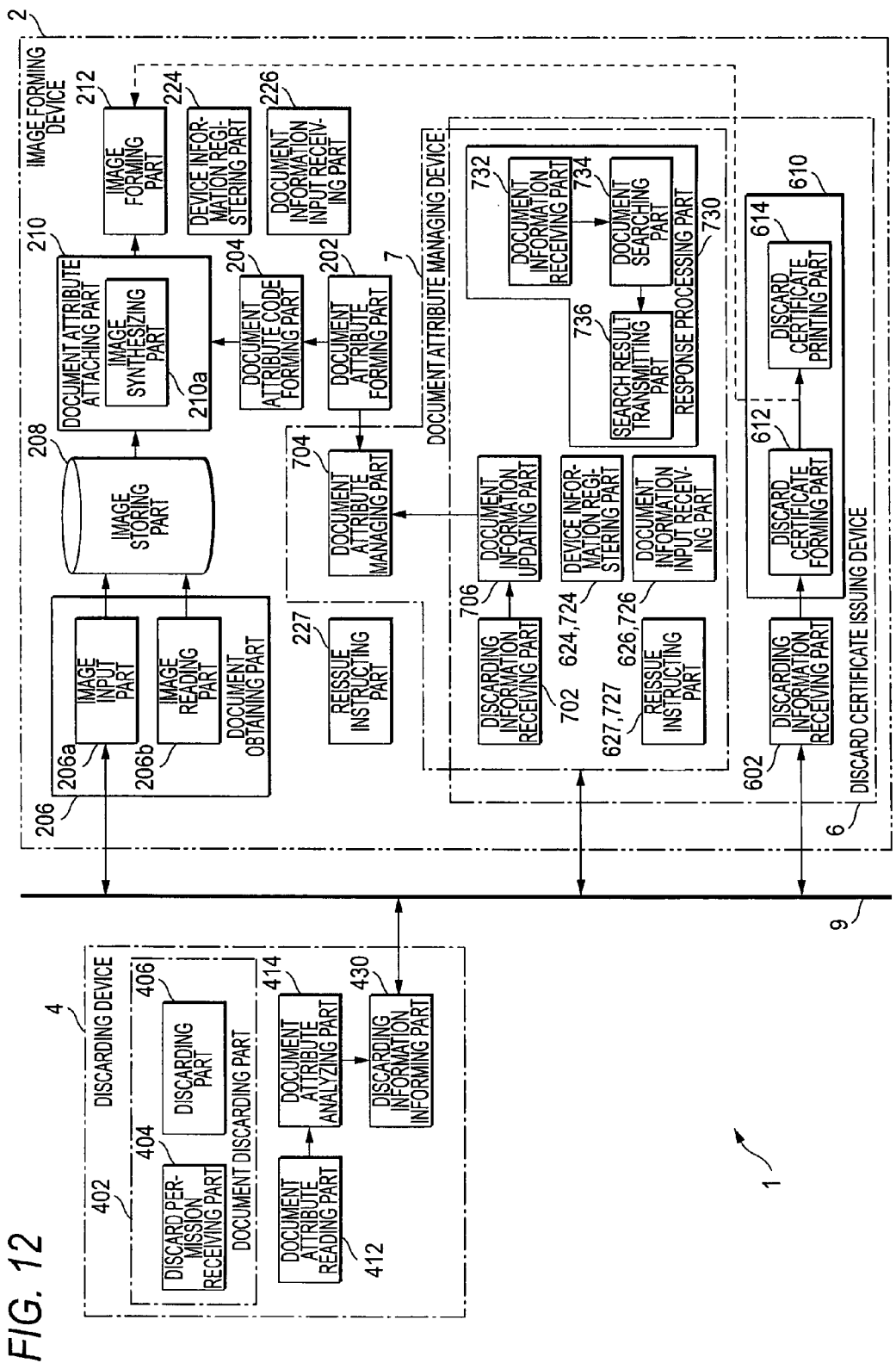
FIG. 12 is a functional block diagram showing a structural example of a fourth embodiment of the document managing system according to the present invention.

FIG. 12 is a functional block diagram showing a structural example of a fourth embodiment of a document managing system according to the present invention. Here, a modified example is shown relative to the structure of the system shown in FIG. 4 in which the image forming device 2 includes the function of the discard certificate issuing device 6.

The document managing system 1 of the fourth embodiment is characterized in that the registered state (especially, whether or not a document is discarded) of a document attribute managing device 7 of a document outputted in an image forming device 2 can be recognized from other device (including another document attribute managing device 7) than the document attribute managing device 7.

Further, the document managing system of the fourth embodiment is characterized in that a discarding device 4 carries out a discarding process, a discard certificate issuing device 6 issues a discard certificate for certifying the discarding process, then, when the document attribute managing device 7 receives an inquiry about the registered state of the document from a device, the document attribute managing device 7 returns the registered state of the document thereto, and when the device receiving the response receives a request for reissuing the discard certificate from a user, the device can instructs to issue the discard certificate in accordance with an instruction of the user.

Especially, different points of the fourth embodiment from a below-described fifth embodiment and a sixth embodiment reside in that the device information of the document attribute managing device 7 for registering and managing document attribute managing information is registered and managed respectively by devices themselves except the discarding device 4 (in the case of the document attribute managing device 7, other document attribute managing device 7), and the devices except the discarding device 4 respectively inquire about the registered state of the document or instruct to reissue the discard certificate.

In the document managing system 1 of the fourth embodiment, firstly, the image forming device 2, the discard certificate issuing device 6, and the document attribute managing device 7 include, in addition to the modified structure of the first embodiment, device information registering parts 224, 624 and 724 for storing and managing the document attribute managing device specifying information of other document attribute managing device 7 and corresponding address information in a prescribed storing medium such as a hard disk device as shown in FIG. 8A or FIG. 8C, document information input receiving parts 226, 626 and 726 for receiving an input of document information to be searched to inform the document attribute managing device 7 of the input of the document information and instruct to search the document, and reissue instructing parts 227, 627 and 727 for instructing to reissue the discard certificate in accordance with the instruction of the user based on the searched result of the document from the document attribute managing device 7.

In the structure of the system that the discard certificate issuing device 6 includes the function of the document attribute managing device 7, as shown in the drawing, the device information registering parts 624 and 724 may be respectively collected together to one function part. Similarly, the document information input receiving parts 626 and 726 may be collected together to one function part. Further, the reissue instructing parts 627 and 727 may be collected together to one function part. Further, in the structure of the system that the image forming device 2 includes the function of the discard certificate issuing device 6 or the document attribute managing device 7, the device information registering parts 224, 624 and 724 may be respectively collected together to one function part. Similarly, the document information input receiving parts 226, 626 and 726 may be collected together to one function part and the reissue instructing parts 627 and 727 may be also collected together to one function part.

A registering process to the device information registering parts 224, 624 and 724 may be realized in accordance with the operation of the user by providing a registering information input receiving part as in the second embodiment. Further, as in the third embodiment, a device searching part, a device information informing part or a device information receiving part may be provided to automatically carry out the registering process by using a broadcast communication without the operation of the user.

The document information input receiving parts 226, 626 and 726 transmit the document specifying information to be searched inputted from the user to the document attribute managing device 7 registered in the device information registering parts 224, 624 and 724.

The image forming device 2, the discard certificate issuing device 6 and the document attribute managing device 7 respectively display the response result on a prescribed display device. Then, when the request for reissuing the discard certificate is received from the user in accordance with the displayed result, a prescribed discard certificate issuing device 6 (for instance, a discard certificate issuing device 6 different from the discard certificate issuing device 6 that is used the last time) is instructed to issue the discard certificate.

Further, this embodiment has a feature that the document attribute managing device 7 is provided with a response processing part 730 for collating the document information to be searched received respectively from the devices with the document attribute managing information managed in a document attribute managing part 704 to search whether or not a relevant document is present and return the state of the received document specifying information to be searched.

The response processing part 730 includes a document information receiving part 732 for receiving the document information to be searched from the devices respectively, a document searching part 734 for collating the document information received by the document information receiving part 732 as a search key with contents registered in the document attribute managing part 704 to search the relevant document and a search result transmitting part 736 for transmitting the search result of the document searching part 734.

Fourth Embodiment

Processing Procedure

Figure 13:
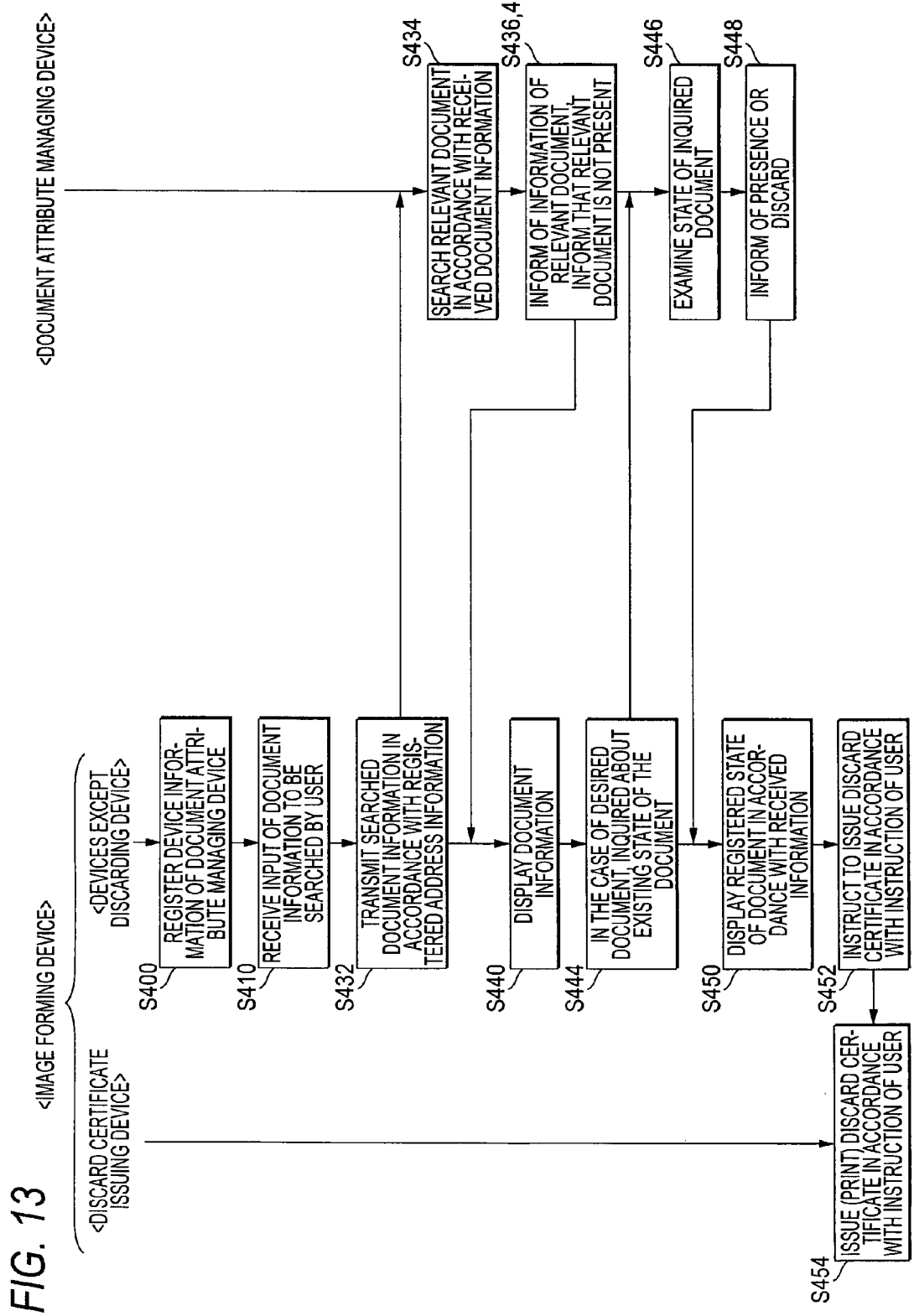
FIG. 13 is a flowchart showing one example of a processing procedure in the document managing system of the fourth embodiment.

FIG. 13 is a flowchart showing one example of a processing procedure in the document managing system 1 of the fourth embodiment. Processing steps of the fourth embodiment are designated by number of the 400 level.

Initially, as a precondition, it is assumed that an output process (a printing process) of a document to an output medium P, a discarding process of the output medium P on which the document is printed, an issuing process of the discard certificate and an updating process of registering information in the document attribute managing part 704 are completed by any of the above-described first to third embodiments.

Firstly, in the image forming device 2, the discard certificate issuing device 6 or the document attribute managing device 7, the device information registering parts 224, 624 and 724 coordinate the document attribute device specifying information of the document attribute managing device 7 (in the case of the document attribute managing device 7, other document attribute managing device 7) with the corresponding address information and register the information (S400). This registering process may be carried out in the same way as the steps S210 to S218 of the second embodiment, or the steps S300 to S318 of the third embodiment.

The user employs the image forming device 2, the discard certificate issuing device 6 or the document attribute managing device 7 to search the document attribute managing information registered in the document attribute managing device 7. For instance, a document state searching process (also called a document state obtaining process) is started when the document information input receiving parts 226, 626 and 726 receive the input of the document information to be searched by the user (S410). As the document information to be searched, the output device specifying information of the image forming device 2 used in the output process or any one or an arbitrary combination of process time information, user information or service type information of document specifying information for specifying the document to be searched may be used.

The document information input receiving parts 226, 626 and 726 refer to the address information of the document attribute managing device 7 registered in the device information registering parts 224, 624 and 724 to inform the document attribute managing device 7 of the document information to be searched inputted by the user and instruct to search the document (S432).

In the document attribute managing device 7 receiving this information (as shown in FIG. 12, the document attribute managing device may be provided in the image forming device 2), the response processing part 730 collates the received document information to be searched as the search key with the contents of the document attribute managing information managed in the document attribute managing part 704 to search the relevant document (S434).

When the response processing part 730 can search the relevant document, the response processing part 730 returns the document attribute managing information of the relevant document (S436). When the response processing part 730 cannot search the relevant document, the response processing part returns "the relevant document is not found" (S438).

The contents of the response of the document attribute managing information of the relevant document include, for instance, when, by whom or in what service (for instance, a copy) the document is outputted that is specified by, for instance, the process time information, the user information or the service type information of the document specifying information. Further, when the document attribute managing part 704 stores image data during the output process as an image log, the image log may be returned for recognizing the document.

The devices respectively receiving the response of the searching process from the document attribute managing device 7 display the result of the searching process on a prescribed display medium (S440). When the user recognizes this display to decide that the document is a desired document, the user inquires the document attribute managing device 7 about the registered state of the document (especially, whether or not the discarding process is carried out) (S444).

In the document attribute managing device 7 receiving the inquiry, the response processing part 730 collates the document information with the contents of the attribute managing information registered and managed in the document attribute managing part 704 to examine the state of the inquired document (especially, whether or not the discarding process is carried out) (S446). Then, in accordance with the examined result, the response processing part 730 responds as to whether the inquired document is in a state of a "non-discard (presence)" or a "discard" (S448).

The devices respectively receiving the response to the inquiring process of the document state from the document attribute managing device 7 display the registered state (especially, whether or not the discarding process is carried out) of the inquired document based on the result of the inquiring process on the prescribed display medium (S450). When the document is in the state of the "discard", the user may instruct to issue the discard certificate (a virtual instruction for reissuing the discard certificate) (S452). The discard certificate issuing device 6 receiving the instruction for issuing the discard certificate prints (issues) the discard certificate on the output medium P in accordance with the instruction of the user (S454).

When the image forming device 2 includes the function of the discard certificate issuing device 6, if the image forming device 2 receives the instruction for searching the document or reissuing the discard certificate from the user, the image forming device 2 itself may reissue the discard certificate.

Fifth Embodiment

Structure of System

Figure 14:
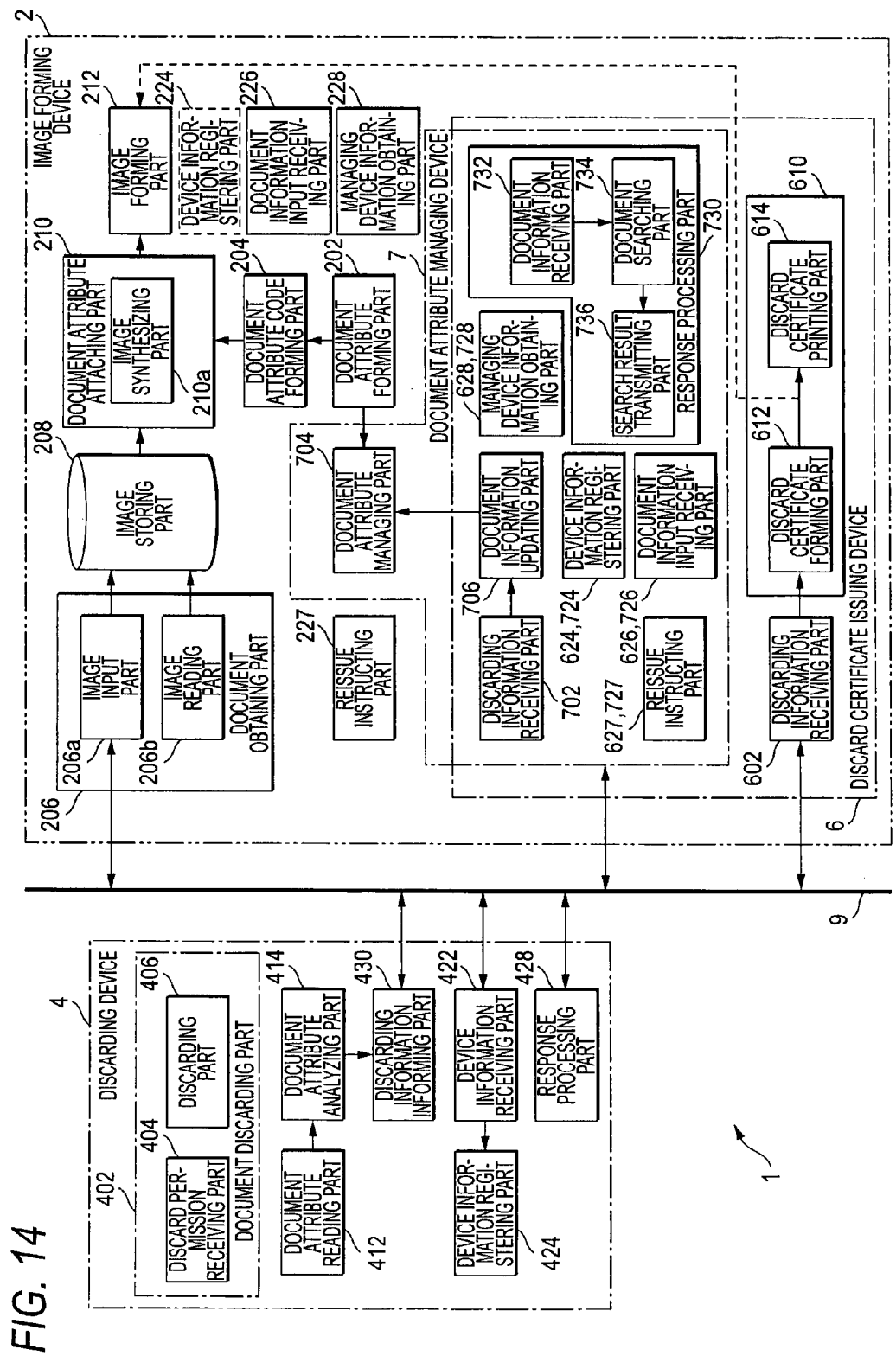
FIG. 14 is a functional block diagram showing a structural example of a fifth embodiment of the document managing system according to the present invention.

FIG. 14 is a functional block diagram showing a structural example of a fifth embodiment of a document managing system according to the present invention. Here, a modified example is shown relative to the structure of the system of the fourth embodiment shown in FIG. 12 and may be applied to structure of the system of the second embodiment shown in FIG. 7 or the third embodiment shown in FIG. 10.

The document managing system 1 of the fifth embodiment is characterized in that the registering state (especially, whether or not a document is discarded) of a document attribute managing device 7 of a document outputted in an image forming device 2 can be recognized from other device (including other document attribute managing device 7) than the document attribute managing device 7. This point is the same as that of the above-described fourth embodiment or a below-described sixth embodiment.

Further, the document managing system of the fifth embodiment is characterized in that a discarding device 4 carries out a discarding process, a discard certificate issuing device 6 issues a discard certificate for certifying the discarding process, then, when the document attribute managing device 7 receives an inquiry about the registered state of the document from a device, the document attribute managing device 7 returns the registered state of the document thereto, and when the device receiving the response receives a request for reissuing the discard certificate from a user, the device can instructs to issue the discard certificate in accordance with an instruction of the user. This point is also the same as that of the above-described fourth embodiment or the below-described sixth embodiment.

However, the fifth embodiment is different from the fourth embodiment in view of a point that the discarding device 4 registers and manages the device information of the document attribute managing device 7 for registering and managing document attribute managing information. Further, the fifth embodiment is the same as the fourth embodiment and different from the below-described sixth embodiment in view of a point that devices except the discarding device 4 respectively inquire about the registered state of the document or instruct to reissue the discard certificate.

Namely, as a basic structure, in the document managing system of the fifth embodiment, since a device information registering part 424 is provided as in the second embodiment or the third embodiment, and the device information of the document attribute managing device 7 for registering and managing the document attribute managing information is registered in the discarding device 4, the fifth embodiment is characterized in that the devices except the discarding device 4 respectively inquire about the device information of the document attribute managing device 7 registered in the device information registering part 424 of the discarding device 4 to specify the address information of the document attribute managing device 7 on the basis of the obtained device information and search whether or not the document exists or reissue the discard certificate.

In the document managing system 1 of the fifth embodiment, firstly, the discarding device 4 includes a device information receiving part 422 and the device information registering part 424 like the third embodiment in addition to the structure of the fourth embodiment. The discarding device 4 includes a response processing part 428 for returning document attribute managing device specifying information registered in the device information registering part 424 and address information corresponding thereto to a request for obtaining the device information from the devices respectively.

Further, the image forming device 2, the discard certificate issuing device 6 and the document attribute managing device 7 include managing device information obtaining parts 228, 628 and 728 for obtaining from the discarding device 4 the device information of other document attribute managing device 7 (that is, excluding the document attribute managing device 7 itself) for registering and managing document attribute managing information in addition to the structure of the fourth embodiment.

When the structure of the system is employed that the discard certificate issuing device 6 includes the function of the document attribute managing device 7, as shown in the drawing, the managing device information obtaining parts 628 and 728 may be respectively collected together to one function part. Further, in the structure of the system that the image forming device 2 includes the function of the discard certificate issuing device 6 or the document attribute managing device 7, the managing device information obtaining parts 228, 628 and 728 may be respectively collected together to one function part.

When the managing device information obtaining parts 228, 628 and 728 obtain the device information (the document attribute managing device specifying information and the corresponding address information) of the document attribute managing device 7 for registering and managing the document attribute managing information from the discarding device 4, the managing device information obtaining parts 228, 628 and 728 accumulate the device information of the document attribute managing device 7 in an inner part.

Device information registering parts 224, 624 and 724 may be provided as in the fourth embodiment. In this case, the managing device information obtaining parts 228, 628 and 728 may additionally register the device information of the document attribute managing device 7 obtained from the discarding device 4 in the device information registering parts 224, 624 and 724.

In this embodiment, the device information registering parts 224, 624 and 724 do not necessarily need to be provided in the image forming device 2, the discard certificate issuing device 6 and the document attribute managing device 7.

Fifth Embodiment

Processing Procedure

Figure 15:
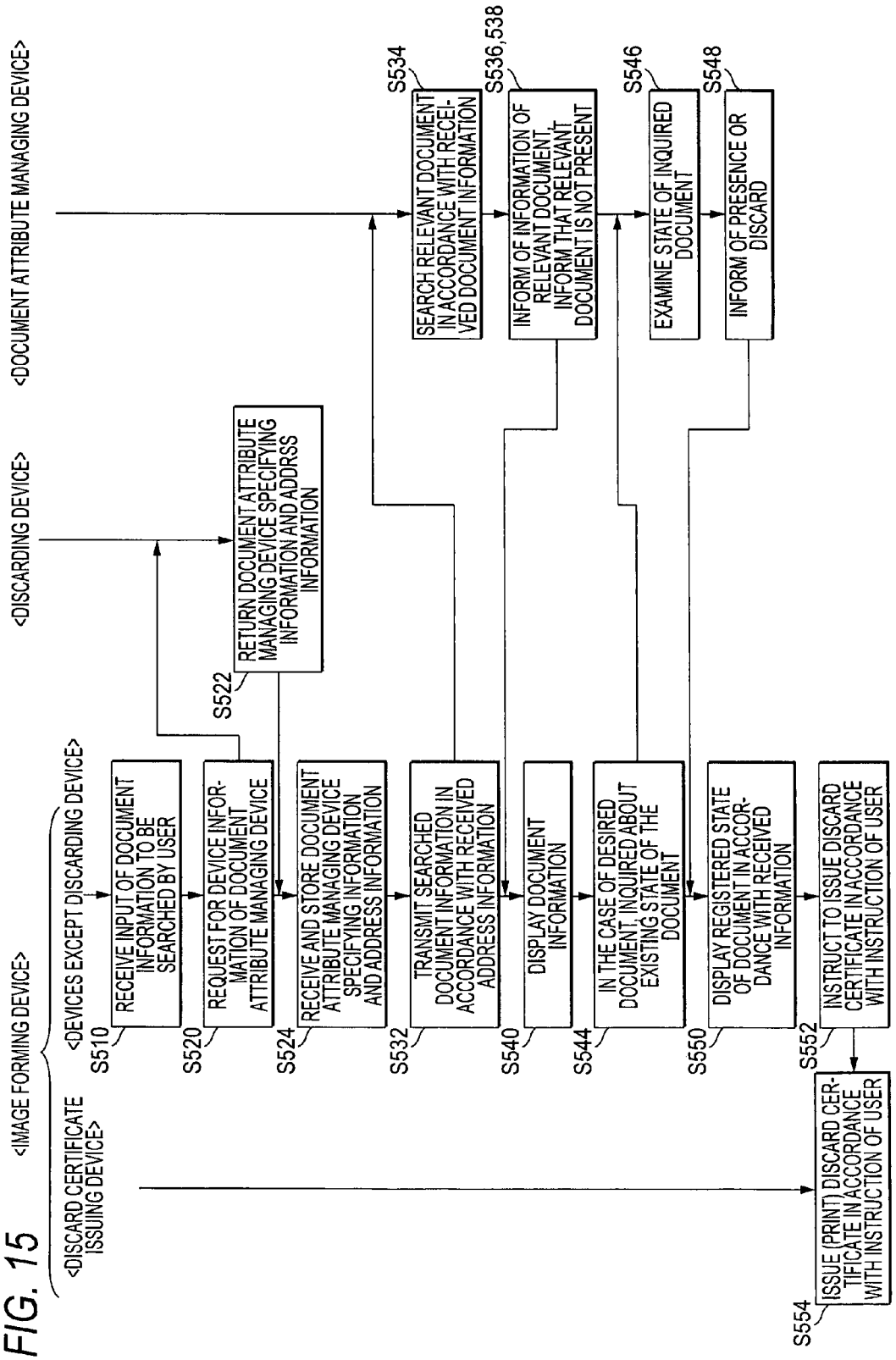
FIG. 15 is a flowchart showing one example of a processing procedure in the document managing system of the fifth embodiment.

FIG. 15 is a flowchart showing one example of a processing procedure in the document managing system 1 of the fifth embodiment. Here, a modified example is shown relative to the processing procedure of the fourth embodiment shown in FIG. 13. Processing steps of the fifth embodiment are designated by number of the 500 level. Processing steps the same as or corresponding to those of the fourth embodiment are designated by numbers of the 10 level and the 1 level the same as those of the fourth embodiment. Now, different points from the fourth embodiment will be mainly described below.

Initially, as a precondition, it is assumed that an output process (a printing process) of a document to an output medium P, a discarding process of the output medium P on which the document is printed, an issuing process of a discard certificate and an updating process of registering information in a document attribute managing part 704 are completed by any of the above-described first to third embodiments.

Further, it is assumed that the registering process of the document attribute managing device specifying information of the document attribute managing device 7 and the address information corresponding thereto is completed in the same manner as that of the step S400 of the above-described fourth embodiment.

The user employs the image forming device 2, the discard certificate issuing device 6 or the document attribute managing device 7 to search the document attribute managing information registered in the document attribute managing device 7. For instance, a document state searching process is started when document information input receiving parts 226, 626 and 726 receive the input of document information to be searched by the user (S510) similarly to the step S410 of the fourth embodiment.

In the image forming device 2, the discard certificate issuing device 6 or the document attribute managing device 7, the managing device information obtaining parts 228, 628 and 728 request for the device information of the document attribute managing device 7 registered in the discarding device 4 (S520).

In the discarding device 4 receiving the request for obtaining the device information from the devices respectively, the response processing part 428 returns the document attribute managing device specifying information registered in the device information registering part 424 and the address information corresponding thereto (S522).

The managing device information obtaining parts 228, 628 and 728 receiving the response from the discarding device 4 to the request for obtaining the device information store (accumulate) the device information (the document attribute managing device specifying information and the corresponding address information) of the document attribute managing device 7 in an inner storing medium. Otherwise, when the device information registering parts 224, 624 and 724 are provided, the device information is additionally registered in the device information registering parts 224, 624 and 724 (S524).

The document information input receiving parts 226, 626 and 726 inform the document attribute managing device 7 of the document information to be searched inputted from the user by referring to the received address information of the document attribute managing device 7 to instruct to search the document (S532). The following processing steps are the same as those of the fourth embodiment.

Sixth Embodiment

Structure of System

Figure 16:
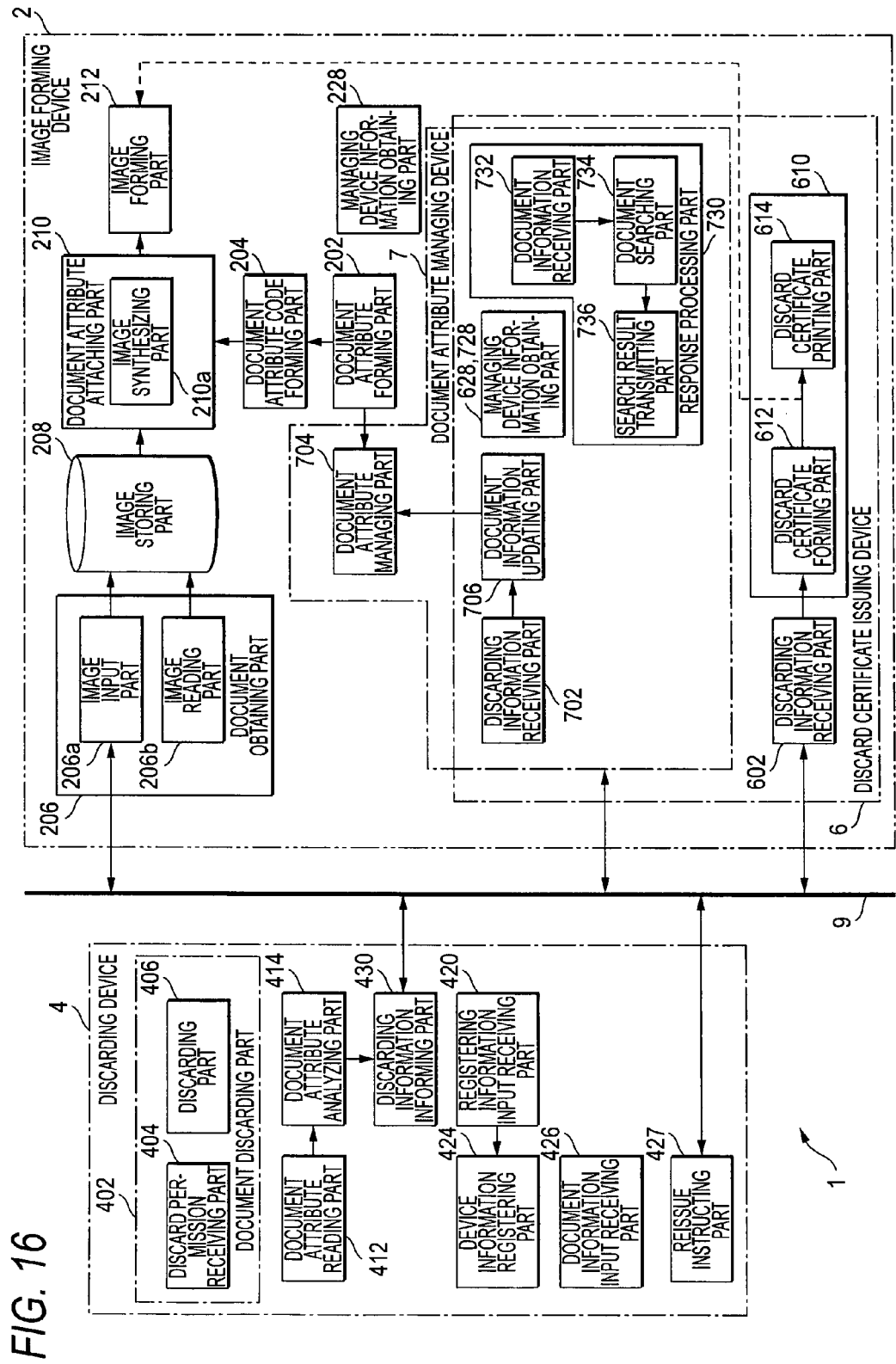
FIG. 16 is a functional block diagram showing a structural example of a sixth embodiment of the document managing system according to the present invention.

FIG. 16 is a functional block diagram showing a structural example of a sixth embodiment of a document managing system according to the present invention. Here, a modified example is shown relative to the structure of the system of the fifth embodiment shown in FIG. 14.

The document managing system 1 of the sixth embodiment is characterized in that the registering state (especially, whether or not a document is discarded) of a document attribute managing device 7 of a document outputted in an image forming device 2 can be recognized from other device (including other document attribute managing device 7) than the document attribute managing device 7. This point is the same as that of the above-described fourth and fifth embodiments.

Further, the document managing system of the sixth embodiment is characterized in that a discarding device 4 carries out a discarding process, a discard certificate issuing device 6 issues a discard certificate for certifying the discarding process, then, when the document attribute managing device 7 receives an inquiry about the registered state of the document from a device, the document attribute managing device 7 returns the registered state of the document thereto, and when the device receiving the response receives a request for reissuing the discard certificate from a user, the device can instructs to issue the discard certificate in accordance with an instruction of the user. This point is also the same as that of the above-described fourth and fifth embodiments.

However, the sixth embodiment is different from the fourth embodiment and the same as the fifth embodiment in view of a point that the discarding device 4 registers and manages the device information of the document attribute managing device 7 for registering and managing document attribute managing information. Further, the sixth embodiment is different from the above-described fourth and fifth embodiments in view of a point that discarding device 4 inquires about the registered state of the document or instructs to reissue the discard certificate.

Namely, as a basic structure, in the document managing system of the sixth embodiment, since a device information registering part 424 is provided as in the second embodiment or the third embodiment, and the device information of the document attribute managing device 7 for registering and managing the document attribute managing information is registered in the discarding device 4, the sixth embodiment is characterized in that the discarding device 4 itself specifies the address information of the document attribute managing device 7 on the basis of the device information of the document attribute managing device 7 registered in the device information registering part 424 to search whether or not the document exists or reissue the discard certificate.

In the document managing system 1 of the sixth embodiment, the image forming device 2, the discard certificate issuing device 6 and the document attribute managing device 7 remove the document information input receiving parts 226, 626 and 726 provided in the fifth embodiment.

Further, the discarding device 4 firstly removes the response processing part 428 provided in the fifth embodiment. Further, the discarding device 4 includes, in addition to the structure of the fifth embodiment, a document information input receiving part 426 for receiving the input of document information to be searched and a reissue instructing part 427 for instructing to reissue the discard certificate in accordance with the instruction of the user based on the searched result of the document from the document attribute managing device 7. The document information input receiving part 426 has a function the same as those of the document information input receiving parts 226, 626 and 726 of the fourth and fifth embodiments. The reissue instructing part 427 has the same function as those of the reissue instructing parts 227, 627 and 727 of the fourth and fifth embodiments.

Sixth Embodiment

Processing Procedure

Figure 17:
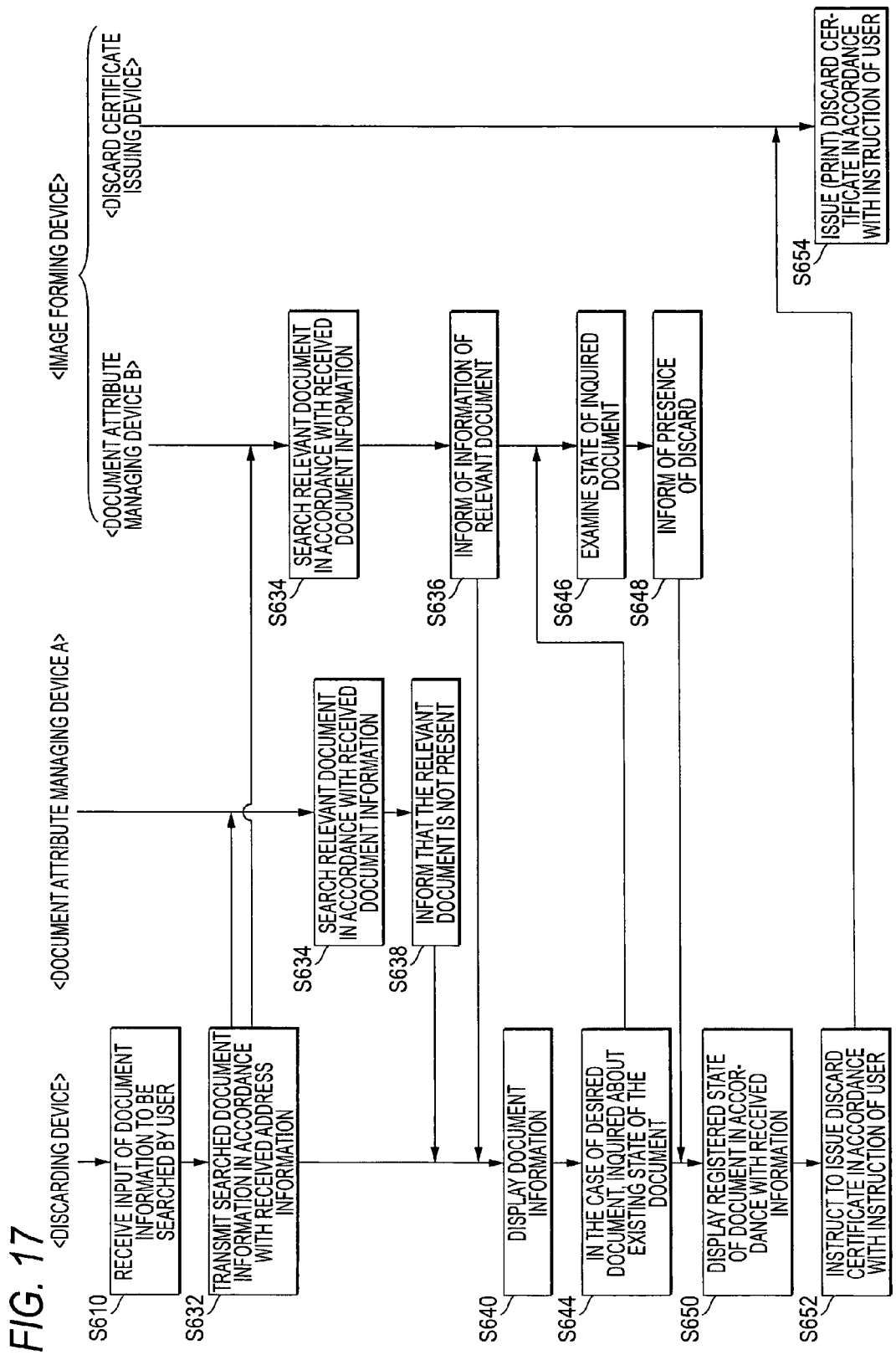
FIG. 17 is a flowchart showing one example of a processing procedure in the document managing system of the sixth embodiment.

FIG. 17 is a flowchart showing one example of a processing procedure in the document managing system 1 of the fifth embodiment. Here, a modified example is shown relative to the processing procedure of the fourth embodiment shown in FIG. 13. Processing steps of the fifth embodiment are designated by number of the 600 level. Processing steps the same as or corresponding to those of the fourth embodiment are designated by numbers of the 10 level and the 1 level the same as those of the fourth and fifth embodiments. Now, different points from the fourth and fifth embodiments will be mainly described below.

Initially, as a precondition, it is assumed that an output process (a printing process) of a document to an output medium P, a discarding process of the output medium P on which the document is printed, an issuing process of the discard certificate and an updating process of registering information in a document attribute managing part 704 are completed by any of the above-described first to third embodiments.

Further, it is assumed that in the discarding device 4, the document attribute managing device specifying information of the document attribute managing device 7 and address information corresponding thereto are completely registered in a device information registering part 424 in the same way as the steps S210 to S218 of the second embodiment, or the steps S300 to S318 of the third embodiment.

The user employs the discarding device 4 to search the document attribute managing information registered in the document attribute managing device 7. For instance, a document state searching process (also called a document state obtaining process) is started when the document information input receiving part 426 receives the input of the document information to be searched by the user (S610) similarly to the step S410 of the fourth embodiment or the step S510 of the fifth embodiment.

The document information input receiving part 226 refers to the address information of the document attribute managing device 7 registered in the device information registering part 424 to inform the document attribute managing device 7 of the document information to be searched inputted by the user and instructs to search the document (S632).

In the document attribute managing device 7 receiving this information (as shown in FIG. 16, the document attribute managing device may be provided in the image forming device 2), a response processing part 730 collates the received document information to be searched as a search key with the contents of the document attribute managing information managed in a document attribute managing part 704 to search the relevant document (S634).

In the document attribute managing device 7 (in this embodiment, a document attribute managing device B) that can search the relevant document, the response processing part 730 returns the document attribute managing information of the relevant document (S636). On the other hand, in the document attribute managing device 7 (in this embodiment, a document attribute managing device A) that cannot search the relevant document, the response processing part 730 returns a response of "the relevant document is not found" (S638). The following processing steps are the same as those of the fourth and fifth embodiments.

(Different Forms of Respective Devices: Structure of Computer)

Figure 18:
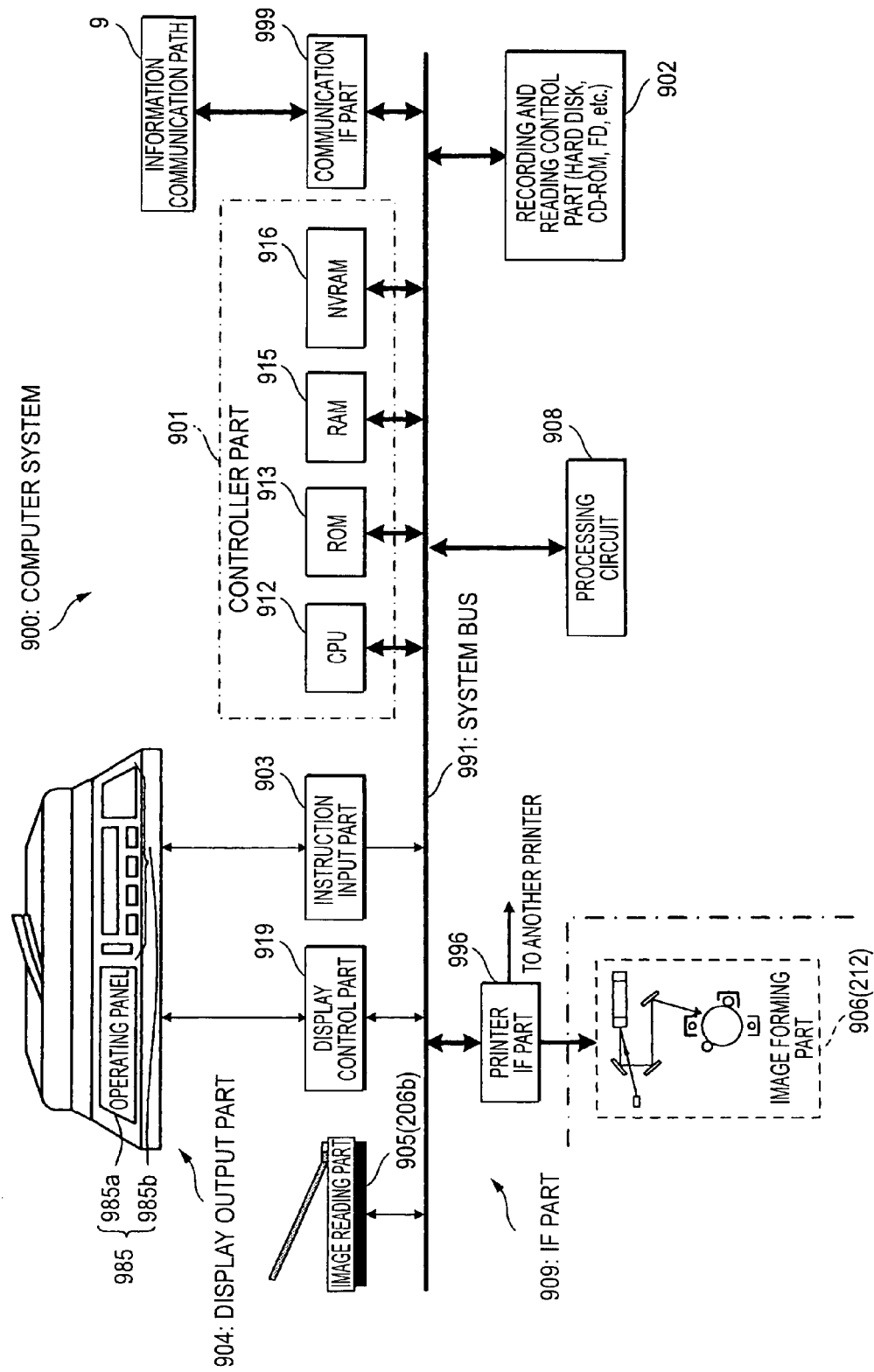
FIG. 18 is a block diagram showing other structural examples of devices respectively provided in the document managing systems of the first to the sixth embodiments.

FIG. 18 is a block diagram showing other structural examples of the image forming device 2, the discarding device 4, the discard certificate issuing device 6, the document attribute managing device 7 and the document managing server 8 provided in the above-described first to sixth embodiments. Here, is shown a more realistic hardware structure composed of a microprocessor that executes software to perform an output process to a discarding process of a document and an issuing process of a discard certificate (collectively called a document managing process) by using a computer such as a personal computer.

Namely, an arrangement for carrying out the document managing process in this embodiment not only is formed by a hardware processing circuit, but also may be realized in a manner of software by using the computer on the basis of a program code for realizing its function.

Therefore, a preferable program for realizing the arrangement according to the present invention in the software by using the compute or a recording medium storing a program that can be read by the computer may be devised as the invention. Thus, the arrangement is executed by the software, and accordingly, an advantage can be obtained that a processing procedure can be easily changed without changing the hardware.

When the computer is allowed to perform a document managing and processing function by the software, the program forming the software is installed, from a recording medium, in a computer incorporated in an exclusive hardware (an incorporated microcomputer), an SOC (System On a Chip: system on chip) for realizing a desired system by installing functions such as a CPU (Central Processing Unit), a logic circuit, a storage device, etc. on one chip or a general-purpose computer capable of executing various kinds of functions by installing various types of programs.

The recording medium can cause the change of state of magnetic, optical and electric energy relative to a reading device provided in hardware resources of the computer in accordance with the described contents of the program to transmit the described contents of the program to the reading device in a signal form corresponding thereto.

For instance, the recording medium may be composed not only of a magnetic disk (including a flexible disk FD) on which a program distributed to provide the program to a user is recorded, separately from the computer, an optical disk (CD-ROM (Compact Disc-Read Only memory), a DVD (including a Digital Versatile Disc), a photo-electro-magnetic disk (including an MO (Magneto Optical Disk)) or a package media (a portable storing medium) formed with a semiconductor memory, but also of a ROM or a hard disk having a program recorded that is provided to the user in a previously incorporated state in the computer.

Further, the program forming the software is not limited to a providing method through the recording medium without using the recording medium, and may be provided through a network such as wired or wireless means.

For instance, when the storing medium on which the program code of the software for realizing the document managing and processing function is supplied to a system or a device and the computer (or the CPU or an MPU) of the system or the device reads the program stored in the storing medium to execute the program, the same effect can be achieved as that of the case where the construction for performing the document managing and processing function is formed with the hardware processing circuit. In this case, the program code itself read from the storing medium realizes the document managing and processing function.

The program code read by the computer may be executed so that not only a function for carrying out a document managing process is realized, but also an OS (Operating System; basic software) operating on the computer performs a part or all of an actual process in accordance with the instruction of the program code to realize the function for carrying out the document managing process by this process.

Further, the program code read from the storing medium may be written in a memory provided in a function expanding card inserted into the computer or a function expanding unit connected to the computer, and then, the CPU provided in the function expanding card or the function expanding unit may perform a part or all of an actual process in accordance with the instruction of the program code to realize the document managing process by the process.

As a file that describes the program code for realizing the document managing and processing function, a program is provided. In this case, the program is not limited to a program provided in the form of a collective program file, and may be provided in the form of an individual program module depending on the structure of the hardware of the system formed with the computer.

For instance, a computer system 900 includes a controller part 901 and a recording and reading control part 902 for reading and recording data from a prescribed storing medium such as a hard disk device, a flexible disk (FD) drive, a CD-ROM (Compact Disk ROM) drive, a semiconductor memory controller or the like.

The controller part 901 includes a CPU (central processing Unit) 912, a ROM (Read Only Memory) 913 as a storing part exclusively used for reading, a RAM (Random Access memory) 915 capable of writing and reading at any time and showing one example of a volatile storing part and a RAM (described as NVRAM) 916 as one example of a non-volatile storing part.

In the above-description, the "volatile storing part" means a storing part of a type that erases the contents of memory when the power of the device is turned off. On the other hand, the "non-volatile storing part" means a storing part of a type that continuously holds the contents of memory even when a main power source of the device is turned off. As the non-volatile storing part, any of the storing parts that can continuously hold the contents of memory may be used. The non-volatile storing part is not limited to a storing part in which a memory element itself made of a semiconductor has a non-volatility, and a storing part may be used in which a volatile memory element is allowed to show a "non-volatility" by providing a backup power source.

The non-volatile storing medium is not necessarily formed with the memory element made of the semiconductor and may be formed by using a medium such as a magnetic disk or an optical disk. For instance, the hard disk device can be used as the non-volatile storing part. Further, a structure for reading information from the recording medium such as the CD-ROM may be used as the non-volatile storing medium.

Further, the computer system 900 includes an instruction input part 903 as a function part forming a user interface, a display output part 904 for presenting to a user a guidance screen or prescribed information such as processed results during an operation and an interface part (an IF part) 909 serving as an interface function between respective function parts.

An image forming part 906 (corresponding to the image forming part 212) may be provided for outputting the processed result on a prescribed output medium (for instance, a printing sheet) to present the document managing and processing result to the user. It is to be understood that when the image forming device 2 is formed, the image forming part 906 needs to be provided. Further, in the discard certificate issuing device 6, when a discard certificate is outputted to the output medium P, the image forming part 906 also needs to be provided. Further, when a copying function is provided, an image reading part 905 (corresponding to the image reading part 206*b*) for reading an image may be provided.

As the instruction input part 903, for instance, an operating key part 985*b* of a user interface part 985 may be used, or a keyboard or a mouse may be used.

The display output part 904 includes a display control part 919 and a display device. As the display device, for instance, an operating panel part 985*a* of the user interface part 985 may be used. Otherwise, other display parts such as a CRT (cathode Ray Tube) or an LCD (Liquid Crystal Display) may be used.

For instance, the display control part 919 displays guidance information or an entire image fetched by the image reading part 905 on the operating panel part 985*a* or the display part. Further, the display control part is also used as a display device for informing the user various kinds of information. Further, the instruction input part 903 for inputting the prescribed information by a finger tip or a pen may be formed by providing a display part having a touch panel on its display surface.

The interface part 909 includes, for instance, a printer IF part 996 serving as an interface function to the image forming part 906 or other printer and a communication IF part 999 for transmitting and receiving communication data from an information communication path 9 as well as a system bus 991 as a transfer path of processing data (including image data) or control data.

In the above-described structure, the CPU 912 controls the entire parts of the system through the system bus 991. The control program of the CPU 912 is stored in the ROM 913. The RAM 915 is formed with an SRAM (Static Random Access Memory) to store program control variables or data for various kinds of processes. Further, the RAM 915 includes an area for temporarily storing data obtained by a calculation according to a prescribed application program or data obtained from an external part.

For instance, the program for allowing the computer to perform the document managing and processing function is distributed through the recording medium such as the CD-ROM. Otherwise, this program may be stored not in the CD-ROM, but in the FD. Further, an MO drive may be provided to store the program in the MO. Further, the program may be stored in other recording medium such as a non-volatile semiconductor memory card including a flash memory. Further, the program may be downloaded and obtained or updated via a network such as an internet from other server.

As the recording medium for providing the program, may be employed the optical recording medium such as the DVD, the photo-electro magnetic recording medium such as the MO, a tape medium, the magnetic recording medium and the semiconductor memory such as an IC card or a miniature card as well as the FD or the CD-ROM. In the FD or the CD-ROM as one example of the recording medium, a part or all of the functions necessary for realizing the document managing and processing function may be stored.

Further, the hard disk device includes areas for storing the data for the various kinds of processes by the control program and temporarily storing a large quantity of data obtained in the device itself or the data obtained from the external part.

In the above-described structure, a document managing and processing program is installed in the RAM 915 from the recording medium capable of reading data such as the CD-ROM in which the program for executing the above-described document managing and processing method (that is, the processing procedure shown in each flowchart) is stored in accordance with a command by an operator through the operating key part 985*b*. Further, the document managing and processing program is activated by the command of the operator through the operating key part 985*b* or an automatic process.

The CPU 912 executes various kinds of processes necessary for the document managing and processing method in accordance with the document managing and processing program, stores the processed results in the RAM 915 or a storage device such as the hard disk, and outputs the processed results to the operating panel part 985*a* or the display device such as the CRT or the LCD as required.

The system is not limited to the structure using the computer as described above. The image forming device 2, the discarding device 4, the discard certificate issuing device 6, the document attribute managing device 7 and the document managing server 8 for carrying out the output process to the discarding process of the document may be formed by combining together hardware for exclusively performing the processes of the function parts respectively shown in the block diagrams.

For instance, all the processes of the function parts for the document managing process are not carried out by the software and a processing circuit 908 may be provided for carrying out a part of the processes of the function parts by exclusively employed hardware. An arrangement for carrying output the processes by the software flexibly meets a parallel process or a continuous process. However, as the processes are complicated, a processing time is increased, so that a processing speed is disadvantageously lowered.

As compared therewith, when the hardware processing circuit is formed, even if the processes are complicated, the processing speed can be prevented from being lowered and an accelerator system is formed for achieving a high speed that can obtain a high throughput.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A document managing system comprising:
    an image forming device that includes an image forming part, and forms a document on a prescribed output medium;
    a discarding device that includes a document discarding part that discards the document formed on the output medium by the image forming device; and
    a discard certificate issuing device that includes a discard certificate issuing part, and issues a certificate of a discarding process in the discarding device, wherein
    the discarding device comprises a discarding information informing part that informs the discard certificate issuing device of information of the discarding process during the discarding process, and
    the discard certificate issuing part of the discard certificate issuing device issues the certificate of the discarding process in accordance with the information of the discarding process reported from the discarding information informing part of the discarding device.

2. The document managing system as claimed in claim 1, wherein the discard certificate issuing device is provided in the image forming device forming the document to be discarded.

3. A document managing system as claimed in claim 1, further comprising:
    a document attribute managing device that includes a document attribute managing part, registers document attribute managing information having document specifying information for exclusively specifying the document outputted by the image forming device and information showing whether or not the document is already discarded in a prescribed storing medium, and manages the document attribute managing information and a document information updating part,
    wherein
    the discarding information informing part informs the document attribute managing device of the information of the discarding process during the discarding process, the document attribute managing part in the document attribute managing device registers information showing that the document is not yet discarded in the storing medium in a case where the image forming device forms the document in the output medium, and,
    in a case where the information of the discarding process reported from the discarding device indicates that the document is already discarded, the document information updating part changes a non-discard to a discard.

4. The document managing system as claimed in claim 1, wherein the document attribute managing device is provided in the image forming device forming the document to be discarded.

5. The document managing system as claimed in claim 1, wherein
    the image forming device has an attaching part that attaches device information for specifying the discard certificate issuing device to the output medium of the document, and
    the discarding information informing part of the discarding device specifies the device information attached to the output medium of the document during the discarding process and informs the discard certificate issuing device corresponding to the specified device information of the information of the discarding process.

6. The document managing system as claimed in claim 5, wherein
    the attaching part of the image forming device attaches address information for specifying a destination to which the information of the discarding process is reported in the discard certificate issuing device as the device information, and
    the discarding information informing part of the discarding device extracts the address information attached to the output medium of the document during the discarding process and informs the discard certificate issuing device of the information of the discarding process on the basis of the extracted address information.

7. The document managing system as claimed in claim 5, wherein
    the attaching part of the image forming device attaches to the output medium of the document certificate issuing device specifying information that can exclusively specify the discard certificate issuing device as the device information,
    each of the image forming device, discarding device, discard certificate issuing device and document attribute managing device has a device information registering part that registers and manages the address information for specifying the destination to which the information of the discarding process is reported in the discard certificate issuing device in the prescribed storing medium in coordination with the certificate issuing device specifying information, and
    the discarding information informing part of the discarding device extracts the certificate issuing device specifying information attached to the output medium of the document during the discarding process, collates the extracted certificate issuing device specifying information with the information registered in the device information registering part to specify the address information for specifying the destination to which the information of the discarding process is reported, and informs the discard certificate issuing device of the information of the discarding process in accordance with the specified address information.

8. The document managing system as claimed in claim 7, wherein the device having the device information registering part comprises a registering information input receiving part that receives the input of an operator of the information to be registered in the device information registering part.

9. The document managing system as claimed in claim 7, wherein
each of the image forming device, discarding device, discard certificate issuing device and document attribute managing device comprises:
   a device search part that searches all other devices existing in the system; and
   a device information informing part that informs the device information registering parts of all other devices searched by the device search part of device specifying information for exclusively specifying the device itself and the address information of itself.

10. A document managing system comprising:
an image forming device that includes an image forming part, and forms a document on a prescribed output medium;
a discarding device that includes a document discarding part that discards the document formed on the output medium by the image forming device; and
a discard certificate issuing device that includes a discard certificate issuing part, and issues a certificate of a discarding process in the discarding device, wherein
at least one of the image forming device, the discarding device, the discard certificate issuing device and a document attribute managing device comprises:
   a document information input receiving part that receives a document search instruction from the operator to instruct the document attribute managing device to search the document; and
   a reissue instructing part that instructs to reissue the discard certificate in accordance with the instruction of the operator based on a searched result from the document attribute managing device, and
the document attribute managing device comprises:
   a response processing part that searches document attribute managing information registered in the document attribute managing part in accordance with the document search instruction from the document information input receiving part to return the searched result.

11. The document managing system as claimed in claim 10,
wherein
at least one of the image forming device, discarding device, discard certificate issuing device and document attribute managing device comprises:
   a device information registering part that registers and manages address information for specifying the destination of the document attribute managing device to which information is reported in the prescribed storing medium to specify the address information of the document attribute managing device that supplies a search instruction on the basis of the information registered in the device information registering part.

12. The document managing system as claimed in claim 10,
wherein
the discarding device comprises a device information registering part that registers and manages the address information for specifying the destination of the document attribute managing device to which the information is reported, and
at least one of the image forming device, discard certificate issuing device and document attribute managing device specifies the address information of the document attribute managing device that supplies the search instruction on the basis of the information registered in the device information registering part of the discarding device.

13. An image forming device comprising:
an image forming part that forms a document on a prescribed output medium; and
a discard certificate issuing part that issues a certificate of a discarding process in a discarding device for discarding the document formed on the output medium by the image forming part, wherein
the discarding device comprises a discarding information informing part that informs a discard certificate issuing device of the information of the discarding process during the discarding process, and
the discard certificate issuing part of the discard certificate issuing device issues the certificate of the discarding process in accordance with the information of the discarding process reported from the discarding information informing part of the discarding device.

14. An image forming device comprising:
an image forming part that forms a document on a prescribed output medium;
a document attribute managing part that registers document attribute manages information having document specifying information for exclusively specifying the document outputted by the image forming part and information showing whether or not the document is already discarded in a prescribed storing medium and manages the document attribute managing information; and
a document information updating part that changes the information showing whether or not the document is already discarded from a non-discard to a discard in a case where the information of a discarding process reported from a discarding device for discarding the document formed on the output medium by the image forming part indicates that the document is already discarded, wherein
the discarding device comprises a discarding information informing part that informs a discard certificate issuing device of the information of the discarding process during the discarding process, and
a discard certificate issuing part of the discard certificate issuing device issues a certificate of the discarding process in accordance with the information of the discarding process reported from the discarding information informing part of the discarding device.

15. An image forming device according to claim 14, further comprising:
a discard certificate issuing part that issues a certificate of a discarding process in a discarding device for discarding the document formed on the output medium by the image forming part.

16. A discarding device comprising:
a document discarding part that discards a document formed on an output medium by an image forming device; and
a discarding information informing part that informs a document attribute managing device which registers document attribute managing information having document specifying information for exclusively specifying the document outputted by the image forming device and information showing whether or not the document is already discarded in a prescribed storing medium and manages the document attribute managing information of the information of a discarding process during the discarding process in the document discarding part, wherein
a discarding information informing part informs a discard certificate issuing device of the information of the discarding process during the discarding process, and
a discard certificate issuing part of the discard certificate issuing device issues a certificate of the discarding process in accordance with the information of the discarding process reported from the discarding information informing part.

17. A document attribute managing device comprising:
a document attribute managing part that registers document attribute managing information having document specifying information for exclusively specifying a document formed on an output medium by an image forming device and information showing whether or not the document is already discarded in a prescribed storing medium and manages the document attribute managing information;
a discarding information receiving part that receives information of a discarding process reported from a discarding device for discarding the document formed on the output medium by the image forming device; and
a document information updating part that changes the information showing whether or not the document is already discarded from a non-discard to a discard in a case where the information of the discarding process received by the discarding information receiving part indicates that the document is already discarded, wherein
the discarding device comprises a discarding information informing part that informs a discard certificate issuing device of the information of the discarding process during the discarding process, and
a discard certificate issuing part of a discard certificate issuing device issues a certificate of the discarding process in accordance with the information of the discarding process reported from the discarding information informing part of the discarding device.

18. The document attribute managing device as claimed in claim 17, further comprising:
a response processing part that searches the document attribute managing information registered in the document attribute managing part in accordance with a document search instruction from other device to return the searched result.

19. A computer readable medium storing a program causing a computer to execute a process for managing a document, the process comprising:
informing a discard certificate issuing device of information of a discarding process during the discarding process, and
issuing a certificate of a discarding process in the discarding device for discarding a document formed on an output medium by an image forming part for forming the document on the prescribed output medium, wherein issuing the certificate of the discarding process includes issuing the certificate of the discarding process in accordance with the information of the discarding process.

20. A computer readable medium storing a program causing a computer to execute a process for managing a document, the process comprising:
registering document attribute managing information having document specifying information for exclusively specifying a document outputted by an image forming part for forming the document on a prescribed output medium and information showing whether or not the document is already discarded in a prescribed storing medium, and managing the document attribute managing information;
changing the information showing whether or not the document is already discarded from a non-discard to a discard in a case where the information of a discarding process reported from a discarding device for discarding the document formed on the output medium by the image forming part indicates that the document is already, discarded;
informing a discard certificate issuing device of the information of the discarding process during the discarding process; and
issuing a certificate of the discarding process in accordance with the information of the discarding process.

21. A computer readable medium storing a program causing a computer to execute a process for managing a document, the process comprising:
informing a document attribute managing device that registers document attribute managing information having document specifying information for exclusively specifying a document outputted by an image forming device and information showing whether or not the document is already discarded in a prescribed storing medium, and that manages the document attribute managing information of information of a discarding process during the discarding process in a document discarding part for discarding the document formed on an output medium by the image forming device;
informing a discard certificate issuing device of the information of the discarding process during the discarding process, and
issuing a certificate of the discarding process in accordance with the information of the discarding process.

22. A computer readable medium storing a program causing a computer to execute a process for managing a document, the process comprising:
registering document attribute managing information having document specifying information for exclusively specifying a document formed on an output medium by an image forming device and information showing whether or not the document is already discarded in a prescribed storing medium, and managing the document attribute managing information;
receiving information of a discarding process reported from a discarding device for discarding the document formed on the output medium by the image forming device;
changing the information showing whether or not the document is already discarded from a non-discard to a discard in a case where the information of the discarding process received by the discarding information receiving part indicates that the document is already discarded;
informing a discard certificate issuing device of the information of the discarding process during the discarding process, and
issuing a certificate of the discarding process in accordance with the information of the discarding process.

* * * * *